(12) United States Patent
Chen et al.

(10) Patent No.: US 11,782,937 B2
(45) Date of Patent: Oct. 10, 2023

(54) DATA SEARCH METHOD AND APPARATUS BASED ON QUANTUM SIMULATED ALGORITHM, AND DEVICE

(71) Applicant: TENCENT TECHNOLOGY (SHENZHEN) COMPANY LIMITED, Shenzhen (CN)

(72) Inventors: Yu Chen, Shenzhen (CN); Changyu Hsieh, Shenzhen (CN); Yuqin Chen, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 155 days.

(21) Appl. No.: 17/523,840

(22) Filed: Nov. 10, 2021

(65) Prior Publication Data

US 2022/0067040 A1 Mar. 3, 2022

Related U.S. Application Data

(63) Continuation of application No. PCT/CN2021/081810, filed on Mar. 19, 2021.

(30) Foreign Application Priority Data

Apr. 26, 2020 (CN) .......................... 202010337586.6

(51) Int. Cl.
*G06F 16/2458* (2019.01)
*G06N 10/00* (2022.01)

(52) U.S. Cl.
CPC ......... *G06F 16/2462* (2019.01); *G06N 10/00* (2019.01)

(58) Field of Classification Search
CPC .......... G06F 16/2462; G06F 16/90335; G06F 17/18; G06N 10/00; G06N 5/01; G06N 7/01; G06N 10/60; G06N 20/10
(Continued)

(56) References Cited

U.S. PATENT DOCUMENTS

| 2017/0330101 A1 | 11/2017 | Hastings et al. |
| 2018/0011981 A1 | 1/2018 | El Naqa et al. |
| 2019/0266213 A1 | 8/2019 | Hastings |

FOREIGN PATENT DOCUMENTS

| AU | 2020100264 A4 | 3/2020 |
| CN | 103324978 A | 9/2013 |

(Continued)

OTHER PUBLICATIONS

Pastorello et al. "Learning adiabatic quantum algorithms for soling optimization problems". 2019. https://arxiv.org/abs/1909.06870. pp. 1-14 (Year: 2019).*

(Continued)

*Primary Examiner* — Michael Pham
(74) *Attorney, Agent, or Firm* — ANOVA LAW GROUP PLLC

(57) ABSTRACT

A data search method based on a quantum simulated algorithm includes: creating a first search path according to a plurality of pieces of candidate data; obtaining a first processing function corresponding to the first search path, the first processing function comprising the plurality of coefficients, output values of the first processing function being determined by the first search path; traversing at least two value sets of the first search path; obtaining the output values of the first processing function based on a quantum simulated algorithm; respectively using, when the output values of the first processing function converge to a converging value, a plurality of values in a value set corresponding to the converging value as the values of the plurality of (Continued)

coefficients, to obtain a second search path; and searching for target data by using the second search path.

20 Claims, 12 Drawing Sheets

(58) Field of Classification Search
USPC .......................................................... 707/736
See application file for complete search history.

(56) References Cited

FOREIGN PATENT DOCUMENTS

| | | | |
|---|---|---|---|
| CN | 103902826 | A | 7/2014 |
| CN | 107248014 | A | 10/2017 |
| CN | 107742156 | A | 2/2018 |
| CN | 109241022 | A | 1/2019 |
| CN | 109816113 | A | 5/2019 |
| CN | 110162536 | A | 8/2019 |
| CN | 110969254 | A | 4/2020 |
| CN | 111027702 | A | 4/2020 |
| CN | 111027703 | A | 4/2020 |
| CN | 111241356 | A | 6/2020 |
| WO | 2019241879 | A1 | 12/2019 |

OTHER PUBLICATIONS

The State Intellectual Property Office of the People's Republic of China (SIPO) english portions Office Action 1 for for 202010337586.6 dated Jun. 16, 2020 9 Pages (including translation), english protions only.

The World Intellectual Property Organization (WIPO) International Search Report for PCT/CN2021/081810 dated Jun. 22, 2021, 8 Pages (including translation), english portions only.

Feng-Guang Li, "Research on Analysis and Optimization of Adiabatic Quantum Search Algorithm," Chinese Doctoral Dissertations Full-text Database (Basic Science), No. 2019(05), May 15, 2019 (May 15, 2019). 111 pages, english portions only.

Jingshui Yu, "Quantum search algorithm research and calculation of quantum entanglement," China Excellent Master's Thesis Full-text Database Basic Science Series, Issue 11, Nov. 15, 2011 (Nov. 15, 2011). 63 pages, english portions only.

Yongtao Dai, "Design and Simulation Research of Quantum Processing Framework Based on Grover Algorithm," China Excellent Master's Thesis Full-text Database Basic Science Series, Issue 11, Nov. 15, 2017 (Nov. 15, 2017). 64 pages, english portions only.

Jian Lin et al., "Reinforcement learning architecture for automated quantum-adiabatic-algorithm design," arXiv:1812.10797, Dec. 27, 2018. 7 pages.

J.D. Biamonte, "Non-perturbative k-body to two-body commuting conversion Hamiltonians and embedding problem instances into lsing spins," Physical Review A 77, 052331, 2008. 8 pages.

S. Jiang et al., "Quantum Annealing for Prime Factorization," Sci. Rep. 8, 2018. 9 pages.

J. Roland et al., "Quantum Search by Local Adiabatic Evolution," Phys. Rev. A65.042308, 2002. 6 pages.

The European Patent Office (EPO) The Extended European Search Report for 21773270.0 dated Jun. 9, 2022 11 pages.

Yu-Qin Chen et al., "Optimizing Quantum Annealing Schedules: From Monte Carlo Tree Search to QuantumZero," arXiv:2004.02836v1, Apr. 6, 2020 (Apr. 6, 2020). 14 pages.

Hirotaka Irie et al., "Hybrid quantum annealing via molecular dynamics," arXiv:2004.03972v1, Apr. 8, 2020. 14 pages.

* cited by examiner

DATA SEARCH METHOD AND APPARATUS BASED ON QUANTUM SIMULATED ALGORITHM, AND DEVICE

CROSS-REFERENCES TO RELATED APPLICATIONS

This application is a continuation application of PCT Patent Application No. PCT/CN2021/081810, filed on Mar. 19, 2021, which claims priority to Chinese Patent Application No. 202010337586.6, entitled "DATA SEARCH METHOD AND APPARATUS BASED ON QUANTUM SIMULATED ALGORITHM, AND DEVICE" filed on Apr. 26, 2020, the entire contents of both of which are incorporated herein by reference.

FIELD OF THE TECHNOLOGY

Embodiments of the present disclosure relate to the field of computer technologies, and in particular, to a data search method and apparatus based on a quantum simulated algorithm, and a device.

BACKGROUND OF THE DISCLOSURE

With the development of quantum computing technologies, quantum computing is also increasingly applied. Compared with classical computing, the quantum computing greatly improves the data processing efficiency. In adiabatic quantum computing (AQC) in the quantum computing, data is processed by using a search path, and an accurate search path can improve the efficiency of the AQC.

SUMMARY

Embodiments of the present disclosure provide a data search method and apparatus based on a quantum simulated algorithm, and a device. The technical solutions are as follows:

According to an aspect, a data search method based on a quantum simulated algorithm is provided, including: creating first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found; creating a first search path according to the first state data and the second state data, a starting point of the first search path referring to the first state, an ending point referring to the second state, and the first search path including a plurality of coefficients of which values are undetermined; obtaining a first processing function corresponding to the first search path, the first processing function including the plurality of coefficients, output values of the first processing function being determined by the first search path, convergence of the output values of the first processing function indicating that the values of the plurality of coefficients meet a target; traversing at least two value sets of the first search path, each value set including a plurality of values corresponding to the plurality of coefficients, a plurality of values in different value sets being not completely the same; obtaining the output values of the first processing function based on a quantum simulated algorithm by respectively applying the traversed value sets as the plurality of values corresponding to the plurality of coefficients; respectively using, when the output values of the first processing function converge to a converging value, a plurality of values in a value set corresponding to the converging value as the values of the plurality of coefficients, to obtain a second search path; and searching the plurality of pieces of candidate data for the target data by using the second search path.

According to another aspect, a data search apparatus is provided, including: a state data creation module, configured to create first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found; a first path creation module, configured to create a first search path according to the first state data and the second state data, a starting point of the first search path referring to the first state, an ending point referring to the second state, and the first search path including a plurality of coefficients of which values are undetermined; a first function obtaining module, configured to obtain a first processing function corresponding to the first search path, the first processing function including the plurality of coefficients, output values of the first processing function being determined by the first search path, convergence of the output values of the first processing function indicating that the values of the plurality of coefficients meet a target; a set obtaining module, configured to traverse at least two value sets of the first search path, each value set including a plurality of values corresponding to the plurality of coefficients, a plurality of values in different value sets being not completely the same; an output value obtaining module, configured to obtain the output values of the first processing function based on a quantum simulated algorithm by respectively applying the traversed value sets as the plurality of values corresponding to the plurality of coefficients; a second path obtaining module, configured to respectively use, when the output values of the first processing function converge to a converging value, a plurality of values in a value set corresponding to the converging value as the values of the plurality of coefficients, to obtain a second search path; and a data search module, configured to search the plurality of pieces of candidate data for the target data by using the second search path.

According to another aspect, a computer device is provided, including a processor and a memory, the memory storing at least one piece of program code, the at least one piece of program code being loaded and executed by the processor to implement the operations performed in the data search method based on a quantum simulated algorithm.

According to another aspect, a non-transitory computer-readable storage medium is provided, storing at least one piece of program code, the at least one piece of program code being loaded and executed by a processor to implement the operations performed in the data search method based on a quantum simulated algorithm.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

Figure 1:
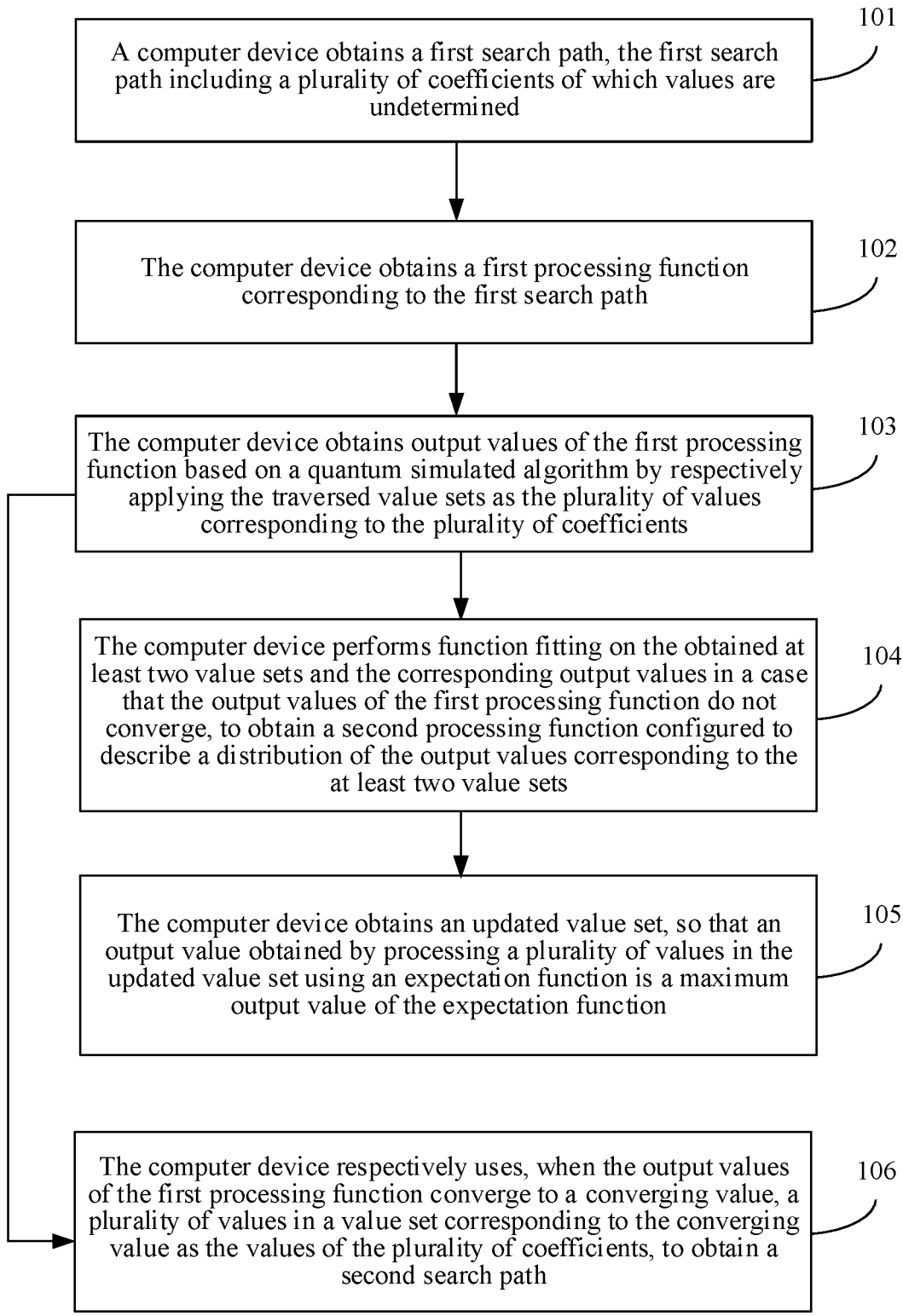
FIG. 1 is a flowchart of a method for obtaining a search path based on a quantum simulated algorithm according to an embodiment of the present disclosure.

To make objectives, technical solutions, and advantages of the embodiments of the present disclosure clearer, the following further describes implementations of the present disclosure in detail with reference to the accompanying drawings.

It may be understood that, the terms "first", "second", "third", and the like used in the present disclosure may be used for describing various concepts in this specification. However, the concepts are not limited by the terms unless otherwise specified. The terms are merely used for distinguishing one concept from another concept. For example, without departing from the scope of the present disclosure, a first processing function may be referred to as a second processing function, and a second processing function may be referred to as a first processing function.

For the terms "each", "a plurality of", and the like used in the present disclosure, "a plurality of" includes two or more, and "each" refers to "each of a plurality of corresponding ones". For example, a plurality of coefficients include 20 coefficients, and each coefficient refers to each of the 20 coefficients.

To facilitate the understanding of the data search method based on a quantum simulated algorithm provided in the embodiments of the present disclosure, keywords involved are explained below.

Quantum computing: a computing mode of performing computation based on quantum logic. A basic unit of data storage in quantum computing is a quantum bit (qubit).

Qubit: a basic unit of quantum computing. In classical computing, 0 and 1 are used as basic units of binary. Therefore, in a process of computing data by using the classical computing, a state of the data is either 0 or 1. However, data in quantum computing can be both 0 and 1. That is, 0 and 1 in quantum computing can co-exist. That is, there is a linear superposition state of 0 and 1. In this way, compared with classical computing, quantum computing can improve a computing speed and a possibility because the linear superposition state exists in quantum computing. The linear superposition state may be shown in formula (1):

$$|\psi\rangle = \alpha|0\rangle + \beta|1\rangle \tag{1}$$

where $|\psi\rangle$ represents a linear superposition state, $\alpha$ represents a probability amplitude when a state of data is 0, $\beta$ represents a probability amplitude when the state of the data is 1, and both $\alpha$ and $\beta$ are complex numbers. Therefore, a modulus square $|\alpha|^2$ of $\alpha$ is used for representing a probability that the state of the data is 0, and a modulus square $|\beta|^2$ of $\beta$ is used for representing a probability that the state of the data is 1.

Eigenstate: For a Hermitian conjugate matrix H, a solution to an equation $H|\psi\rangle = E|\psi\rangle$ is referred to as an eigenstate $|\psi\rangle$ of H, where $|\psi\rangle$ has an energy eigenvalue E.

Ground state: a lowest-energy eigenstate.

Separable state and entangled state: For a pure state: $|\psi\rangle \in H_A \otimes H_B$, if $|\psi\rangle$ can be decomposed into $|\psi\rangle_A \otimes |\psi\rangle_B$, the pure state is referred to as a separable state, and if $|\psi\rangle$ cannot be decomposed into $|\psi\rangle_A \otimes |\psi\rangle_B$, the pure state is referred to as an entangled state.

Adiabatic quantum computing (AQC): a quantum computing mode. A mathematical definition is as follows: For an initial state Hamiltonian H0 and a final state Hamiltonian H1 that act on n particles, each particle having p states and a k-locality, where a ground state of the initial state Hamiltonian H0 is the only separable state, a process in which an output state of the initial state Hamiltonian approaches a ground state of the final state Hamiltonian H1 under the action of a norm $L_2$ is referred to as AQC. The Hamiltonian is used for describing total energy in a quantum system, the initial state Hamiltonian is initial total energy in the quantum system, and the final state Hamiltonian is final total energy in the quantum system. The norm $L_2$ is a square root obtained after a sum of squares of all elements is obtained.

A function $s(t)=1-t/T$ corresponding to a search path is defined, a value range of t is [0, T], and T is an evolution time of the quantum system. The quantum system starts to evolve from the ground state of the initial state Hamiltonian H0 according to a time-dependent Hamiltonian H(s), and finally, the output state of the initial state Hamiltonian H0 approaches the ground state of the final state Hamiltonian H1 under the action of the norm $L_2$. This process is the AQC. The time-dependent Hamiltonian is: $H(s)=sH0+(1-s)H1$, and s is a defined function s(t).

Fidelity: Fidelity is used for representing a similarity between an output state and a ground state of a final state Hamiltonian H1 during AQC. That the output state is closer to the ground state of the final state Hamiltonian H1 indicates a higher fidelity, and a value range of the fidelity is 0 to 1.

Optimal search path: For a fixed evolution time T, a function s(t) is obtained, to substitute an evolution time T into a formula (2) to output a minimum value. A formula (3) is an expression form of a Schrodinger equation. The Schrodinger equation is a basic equation in quantum computing, and is used for describing quantum dynamics in a quantum system.

In the embodiments of the present disclosure, if a problem of obtaining the optimal search path is converted into a problem of obtaining solutions to the formula (2) and the formula (3), the optimal search path is the solutions to the following formula (2) and formula (3):

$$\min_{\{s(t)\}} \langle \psi(T)|H_1|\psi(T)\rangle \qquad (2)$$

$$\frac{\partial}{\partial t}|\psi(t)\rangle = -i(s(t)H_0 + (1-s(t))H_1|\psi(t)\rangle \qquad (3)$$

where $|\psi(T)\rangle$ is a column vector, $\langle\psi(T)|$ is a Hermitian conjugate row vector corresponding to the column vector, and the two vectors are used for representing a quantum pure state in the quantum system;

$$\frac{\partial}{\partial t}|\psi(t)\rangle$$

represents obtaining a first-order partial derivative of $|\psi(t)\rangle$; $H_1$ and $H_0$ are two known parameters; i is an imaginary unit; and when t=0, $|\psi(0)\rangle = |g_0\rangle$, and $|g_0\rangle$ represents a ground state of an initial state Hamiltonian H0.

FIG. 1 is a flowchart of a method for obtaining a search path based on a quantum simulated algorithm according to an embodiment of the present disclosure. This embodiment of the present disclosure is executed by a computer device. In one embodiment, the computer device is a classical computer device. In some embodiments, the computer device is a terminal. The terminal is a portable terminal, a pocket-sized terminal, a handheld terminal, or a terminal of another type, for example, a mobile phone, a computer, a tablet computer, a notebook computer, a desktop computer, a smart speaker, or a smartwatch, but is not limited thereto. In some embodiments, the computer device is a server. The server is an independent physical server, or a server cluster or a distributed system including a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. In another embodiment, the computer device is a quantum computer device. The quantum computer device is a type of physical apparatus that performs high-speed mathematical and logical operations, and stores and processes quantum information by following the laws of quantum mechanics. Characteristics of the quantum computer device mainly include a relatively high operation speed, a relatively strong information processing capability, a wider application range, and the like. If more information is processed by the quantum computer device, it is more advantageous for the quantum computer device to perform operations, so that the accuracy of the operations is more likely to be ensured. Referring to FIG. 1, the method includes the following steps:

101. A computer device obtains a first search path, the first search path including a plurality of coefficients of which values are undetermined.

In this embodiment of the present disclosure, an expression form of the first search path has been determined, relationships between the plurality of coefficients have been determined, an independent variable has been determined, and relationships between the independent variable and the plurality of coefficients have been determined. However, the values of the plurality of coefficients are not determined yet. In some embodiments, the values of the plurality of coefficients are any values, and different search paths corresponding to the first search path may be obtained by setting different values for the plurality of coefficients.

In one embodiment, the first search path is defined as s(t)=1−t/T, and Fourier transformation is performed on the first search path to obtain a search path shown in the following formula (4):

$$s(t) = \frac{t}{T} + \sum_{j=1}^{+\infty} b_j \sin\frac{j\pi t}{T} \qquad (4)$$

where T is an evolution time, t is the independent variable, bi is a coefficient of which a value is undetermined, a value range of j is from 1 to positive infinity, and j is a positive integer.

The formula (4) is an expression form of the first search path in a frequency domain. During AQC, high-frequency oscillation is likely to interfere with a quantum state, resulting in a change from the quantum state into a higher-energy excited state, but in AQC, the quantum state needs to be changed into a lower-energy ground state. Therefore, high-frequency truncation needs to be performed with a frequency number of M. That is, in the foregoing formula (4), the value range of j is no longer from 1 to positive infinity, but is from 1 to M. In some embodiments, M is any low-frequency frequency, for example, any value less than a reference low-frequency frequency, and M is a positive integer.

Therefore, the following formula (5) is a finally obtained first search path, and values of M coefficients need to be determined in the first search path:

$$s(t) = \frac{t}{T} + \sum_{j=1}^{M} b_j \sin\frac{j\pi t}{T} \qquad (5)$$

This embodiment of the present disclosure is described by merely using the first search path shown in the foregoing formula (5) as an example. In another embodiment, the first search path has another expression form. The expression form of the first search path is not limited in this embodiment of the present disclosure.

102. The computer device obtains a first processing function corresponding to the first search path.

In this embodiment of the present disclosure, an association exists between the first processing function and the first search path. In some embodiments, the first processing function is obtained from the first search path and another function through operations. That is, output values of the first processing function are determined by the first search path. The expression form of the first processing function has been determined, and values of all coefficients in the first processing function, other than the plurality of coefficients of which values are undetermined included in the first search path, have been determined, relationships between the plurality of coefficients have been determined, an independent variable has been determined, and relationships between the independent variable and the plurality of coefficients have been determined.

Because the first processing function also includes the foregoing plurality of coefficients of which values are undetermined, if data is inputted to the first processing function, the values of the plurality of coefficients need to be first determined before output values of the first processing function are determined.

In addition, because the values of the plurality of coefficients are different, the output values of the first processing function are also different. In this way, different values are obtained for the plurality of coefficients. When the output values of the first processing function converge to a reference value, it indicates that the values of the plurality of coefficients meet a target. Therefore, the first processing function is a target function of the first search path.

In one embodiment, the first search path and the first processing function meet the following relationship:

$$\min_{\{s(t)\}} \langle \psi(T)|H_1|\psi(T)\rangle \quad (2)$$

$$\frac{\partial}{\partial t}|\psi(t)\rangle = -i(s(t)H_0 + (1-s(t))H_1)|\psi(t)\rangle \quad (3)$$

where $\langle \psi(T)|H_1|\psi(T)\rangle$ in the formula (2) is the first processing function, and $s(t)$ in the formula (3) is the first search path. Each time the values of the plurality of coefficients in the first search path $s(t)$ are determined to cause a value of the variable t in the first processing function to be T after the first search path $s(t)$ is substituted into the first processing function, an output value of the first processing function is a minimum value. In addition, the determined first search path $s(t)$ is substituted into the first processing function for a plurality of times. If all the output values of the first processing function converge, it can be determined that values of a plurality of coefficients in a finally determined first search path $s(t)$ meet the target.

This embodiment of the present disclosure is described by merely using the first processing function determined according to the formula (2) and the formula (3) as an example. In another embodiment, the first processing function has another expression form. The expression form of the first processing function is not limited in this embodiment of the present disclosure.

103. The computer device obtains output values of the first processing function based on a quantum simulated algorithm when the values of the plurality of coefficients are a plurality of values in value sets. In other words, the computer device obtains output values of the first processing function based on a quantum simulated algorithm by respectively applying the traversed value sets as the plurality of values corresponding to the plurality of coefficients.

In this embodiment of the present disclosure, if the computer device traverses at least two value sets of the first search path, and obtains the output values of the first processing function based on a quantum simulated algorithm when the values of the plurality of coefficients are the plurality of values in the traversed value sets respectively, an output value of the first processing function is obtained according to a value set. In this case, the output value is an output value corresponding to the value set. In a process of obtaining the output values of the first processing function, the computer device needs to traverse a plurality of value sets until the output values of the first processing function converge. When the output values of the first processing function do not converge, step 104 is performed. When the output values of the first processing function converge, step 106 is performed.

That the output values of the first processing function do not converge means that all the output values of the first processing function that correspond to at least two value sets that have been traversed do not converge to a specific value. That the output values of the first processing function converge means that output values of the first processing function that correspond to at least two value sets that have been traversed most recently in the at least two value sets that have been traversed converge to a same value. The value to which the first processing function converges is determined according to the first processing function.

In one embodiment, the quantum simulated algorithm includes a plurality of subfunctions and an operation mode of determining the first processing function according to the plurality of subfunctions. The computer device processes the plurality of values in the value sets based on the quantum simulated algorithm, to respectively obtain first values outputted by the plurality of subfunctions, and performs, according to the operation mode, an operation on the first values outputted by the plurality of subfunctions, to obtain the output values of the first processing function.

In some embodiments, the first processing function is a very complex function. If the plurality of values in the value sets are directly used as the values of the plurality of coefficients and substituted into the first processing function, the output values cannot be obtained. However, the quantum simulated algorithm may perform an operation on the plurality of subfunctions according to the operation mode, to obtain the first processing function. The plurality of subfunctions are relatively simple functions. The plurality of values in the value sets are used as the values of the plurality of coefficients, and are substituted into the subfunctions to obtain a first value outputted by each subfunction, so that an operation is performed on a plurality of first values according to the operation mode, to obtain the output values of the first processing function.

104. The computer device performs function fitting on the obtained at least two value sets and the corresponding output values when the output values of the first processing function do not converge, to obtain a second processing function configured to describe a distribution of the output values corresponding to the at least two value sets.

In this embodiment of the present disclosure, if the computer device traverses the at least two value sets of the first search path, and obtains the output values corresponding to the at least two value sets based on the quantum simulated algorithm, the computer device performs function fitting on the obtained at least two value sets and the corresponding output values by using a Gaussian process regression algorithm, to obtain a second processing function configured to describe a distribution of the output values corresponding to the at least two value sets, that is, determines, according to the second processing function, a distribution situation of the output values of the first processing function that correspond to the at least two value sets. The Gaussian process regression algorithm is a machine learning algorithm that performs regression analysis on data by using a Gaussian process, and can use a plurality of known data points corresponding to an original target function to fit a fitting function corresponding to the original target function.

In one embodiment, if the first processing function in this embodiment of the present disclosure is the original target function, and the obtained at least two value sets and the corresponding output values are at least two known data points corresponding to the first processing function, the known data points are fitted by using the following steps to obtain the second processing function.

(1) The computer device obtains at least two value sets and corresponding output values of the first processing function.

In some embodiments, for a first processing function f(x), the first processing function is an undetermined function, and the first processing function is a high-dimensional function. That is, a dimension of a feasible region of the first processing function is high-dimensional, for example, $x \in R^d$, $d \leq 20$, which means that a dimension of the feasible region is 20.

This embodiment of the present disclosure is described by using k value sets that have been obtained as an example. If the k value sets are $x_1, x_2, \ldots x_k$, and all the k value sets meet a requirement of the first processing function on a value range of the coefficients, a plurality of values in the k value sets are respectively substituted into the first processing function, to obtain output values $[f(x_1), f(x_2), f(x_k)]$ of the first processing function that correspond to the k value sets. That is, the k value sets are processed based on the quantum simulated algorithm, to obtain the output values of the first processing function. k is a positive integer, and x represents a value set.

In one embodiment, when the output values of the first processing function that correspond to the k value sets meet a Gaussian distribution, the Gaussian distribution of the output values of the first processing function that correspond to the k value sets is shown in the following formula (6):

$$f(x_{1:k}) \sim N(x_{1:k}, \Sigma_0(x_{1:k}, x_{1:k})) \quad (6)$$

where $x_{1:k}$ represent a first value set to the $k^{th}$ value set, $f(x_{1:k})$ represent the output values of the first processing function that correspond to the k value sets, that is, $f(x_{1:k}) = [f(x_1), f(x_2), f(x_k)]$, $\mu_0$ represents an expected value corresponding to a value set, $\mu_0(x_{1:k})$ represent expected values corresponding to the k value sets, that is, $\mu_0(x_{1:k}) = [\mu_0(x_1), \mu_0(x_2), \ldots, \mu_0(x_k)]$; and $\Sigma_0$ represents a covariance matrix, $\Sigma_0(x_1, x_1)$ represents a covariance matrix determined according to a value set $x_1$, and $\Sigma_0(x_{1:k}, x_{1:k})$ represents covariance matrices corresponding to the k value sets, that is, $$\Sigma_0(x_{1:k}, x_{1:k}) = [\Sigma_0(x_1, x_1), \ldots, \Sigma_0(x_1, x_k); \ldots;$$
$$\Sigma_0(x_k, x_1), \ldots, \Sigma_0(x_k, x_k)]$$

(2) The computer device performs function fitting on the obtained at least two value sets and the corresponding output values, to obtain a second processing function configured to describe a distribution of the output values corresponding to the at least two value sets.

In one embodiment, the computer device obtains a condition probability corresponding to the at least two value sets when the at least two value sets meet a Gaussian distribution, and adjusts the second processing function according to the at least two value sets, the corresponding output values, and the condition probability, to obtain the adjusted second processing function. The condition probability is a probability of obtaining the second processing function based on the at least two value sets and the corresponding output values when the distribution of the output values corresponding to the at least two value sets meets the Gaussian distribution. In some embodiments, the Gaussian distribution is a multivariate Gaussian distribution.

When a joint distribution of any output values of the first processing function meets the Gaussian distribution, and a posterior probability for the second processing function is obtained based on the output values corresponding to the obtained at least two value sets, the posterior probability is used as the condition probability corresponding to the at least two value sets.

In some embodiments, an average value and a variance that correspond to the at least two value sets are obtained when the at least two value sets meet the Gaussian distribution; and the condition probability corresponding to the at least two value sets is obtained according to the average value and the variance.

For example, the foregoing k value sets and the corresponding output values of the first processing function are used as k known data points, and when a value set of the first processing function is x, an output value f(x) is determined according to the k known data points. In this case, according to an assumption of the Gaussian regression process, $[f(x_{1:k}), f(x)]$ meets the Gaussian distribution, and according to a Bayesian rule, the condition probability is determined as shown in the following formula (7):

$$f(x)|f(x_{1:k}) \sim N(\mu_k(x), \sigma_k^2(x)) \quad (7)$$

where $\mu_k(x)$ represents an average value of the second processing function, $\sigma_k^2(x)$ represents a variance of the first processing function, and the average value $\mu_k(x)$ is shown in the following formula (8):

$$\mu_k(x) = \Sigma_0(x, x_{1:k}) \Sigma_0(x_{1:k}, x_{1:k})^{-1} (f(x_{1:k}) - \mu_0(x_{1:k})) + \mu_0(x) \quad (8)$$

where $x_{1:k}$ represent a first value set to the $k^{th}$ value set, $f(x_{1:k})$ represent the output values of the first processing function that correspond to the k value sets, that is, $f(x_{1:k}) = [f(x_1), f(x_2), \ldots, f(x_k)]$, $\mu_0(x)$ represents an expected value corresponding to the value set x, $\mu_0(x_{1:k})$ represent the expected values corresponding to the k value sets, that is, $\mu_0(x_{1:k}) = [\mu_0(x_1), \mu_0(x_2), \ldots, \mu_0(x_k)]$; and $\Sigma_0$ represents a covariance matrix, $\Sigma_0(x_1, x_1)$ represents a covariance matrix determined according to a value set $x_1$, and $\Sigma_0(x_{1:k}, x_{1:k})$ represents covariance matrices corresponding to the k value sets.

The variance $\sigma_k^2(x)$ is shown in the following formula (9):

$$\sigma_k^2(x) = \Sigma_0(x, x) - \Sigma_0(x, x_{1:k}) \Sigma_0(x_{1:k}, x_{1:k})^{-1} \Sigma_0(x_{1:k}, x) \quad (9)$$

where $\Sigma_0$ represents a covariance matrix, $\Sigma_0(x_1, x_1)$ represents a covariance matrix determined according to a value set $x_1$, and $\Sigma_0(x_{1:k}, x_{1:k})$ represents covariance matrices corresponding to the k value sets.

In the foregoing process of determining the condition probability, the condition probability is determined according to the Bayesian rule. The Bayesian rule is used for describing a relationship between a probability that an event 2 is established when an event 1 is established and a probability that the event 1 is established when the event 2 is established. Therefore, according to the Bayesian rule, it is determined that when $f(x_{1:k})$ meets the Gaussian distribution, $[f(x_{1:k}), f(x)]$ also meets a probability of the Gaussian distribution.

Figure 2:
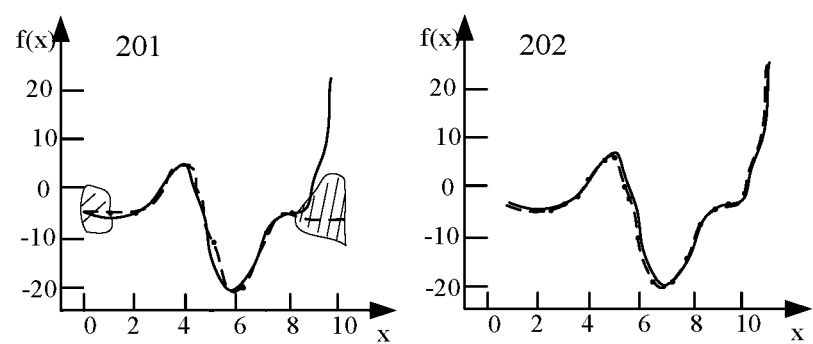
FIG. 2 is a schematic diagram of obtaining an estimation function through fitting by using a Gaussian process regression algorithm according to an embodiment of the present disclosure.

For example, a function corresponding to the plurality of data points is determined according to the plurality of known data points by using the Gaussian process regression algorithm. Referring to FIG. 2, assuming that there is a first processing function $f(x) = x*\sin(x) - 2x*\cos(x)$, a plurality of data points are obtained from the first processing function, and the first processing function is then restored according to the plurality of data points. In FIG. 2, a solid line is a curve corresponding to the first processing function, black points represent obtained data points, a dashed line is a curve corresponding to an estimation function (a second processing function) obtained according to a Gaussian process regression algorithm, and a shaded part corresponds to a 95% confidence interval, that is, a range in which the curve of the estimation function may exist. A schematic curve diagram 201 in FIG. 2 shows a curve corresponding to an estimation function predicted according to eight data points when the eight data points are obtained. The schematic curve diagram 201 includes a relatively large shaded part, which indicates that the predicted curve is not accurate enough. A schematic curve diagram 202 in FIG. 2 shows a curve corresponding to the second processing function predicted according to 17 data points when the 17 data points are obtained. It can be seen that the curve of the second processing function corresponding to the data points can be drawn relatively accurately according to the 17 data points by using the Gaussian process regression algorithm. That is, the Gaussian process regression algorithm can quickly and accurately estimate the function.

This embodiment of the present disclosure is described by merely using a process of obtaining the second processing function according to the foregoing at least two value sets as an example. In some embodiments, for a plurality of value sets, first, the second processing function is initialized, and the obtained second processing function is adjusted each time according to the at least two value sets by using the foregoing steps, to obtain the adjusted second processing function. Then, the adjusted second processing function may be further continuously re-adjusted according to other at least two value sets by repeating the foregoing steps, and so on, to obtain a more accurate second processing function.

105. The computer device obtains an updated value set, so that an output value obtained by processing a plurality of values in the updated value set using an expectation function is a maximum output value of the expectation function.

In the foregoing step 104, the second processing function corresponding to the first processing function can be obtained more accurately according to the known k value sets and the corresponding output values by using the Gaussian process regression algorithm. However, if a more accurate second processing function needs to be obtained, new value sets and corresponding output values need to be continuously obtained, to obtain the more accurate second processing function according to more value sets and corresponding output values. How to obtain the new value sets is a key. Therefore, the expectation function configured to describe an expected return of the second processing function is obtained, and the expectation function is configured to instruct to obtain the updated value set. A best choice of the expectation function is the first processing function. That is, the first processing function is used as the expectation function. However, the first processing function is still an unknown function. Therefore, an expectation function corresponding to an expected improvement (EI) is obtained.

Figure 3:
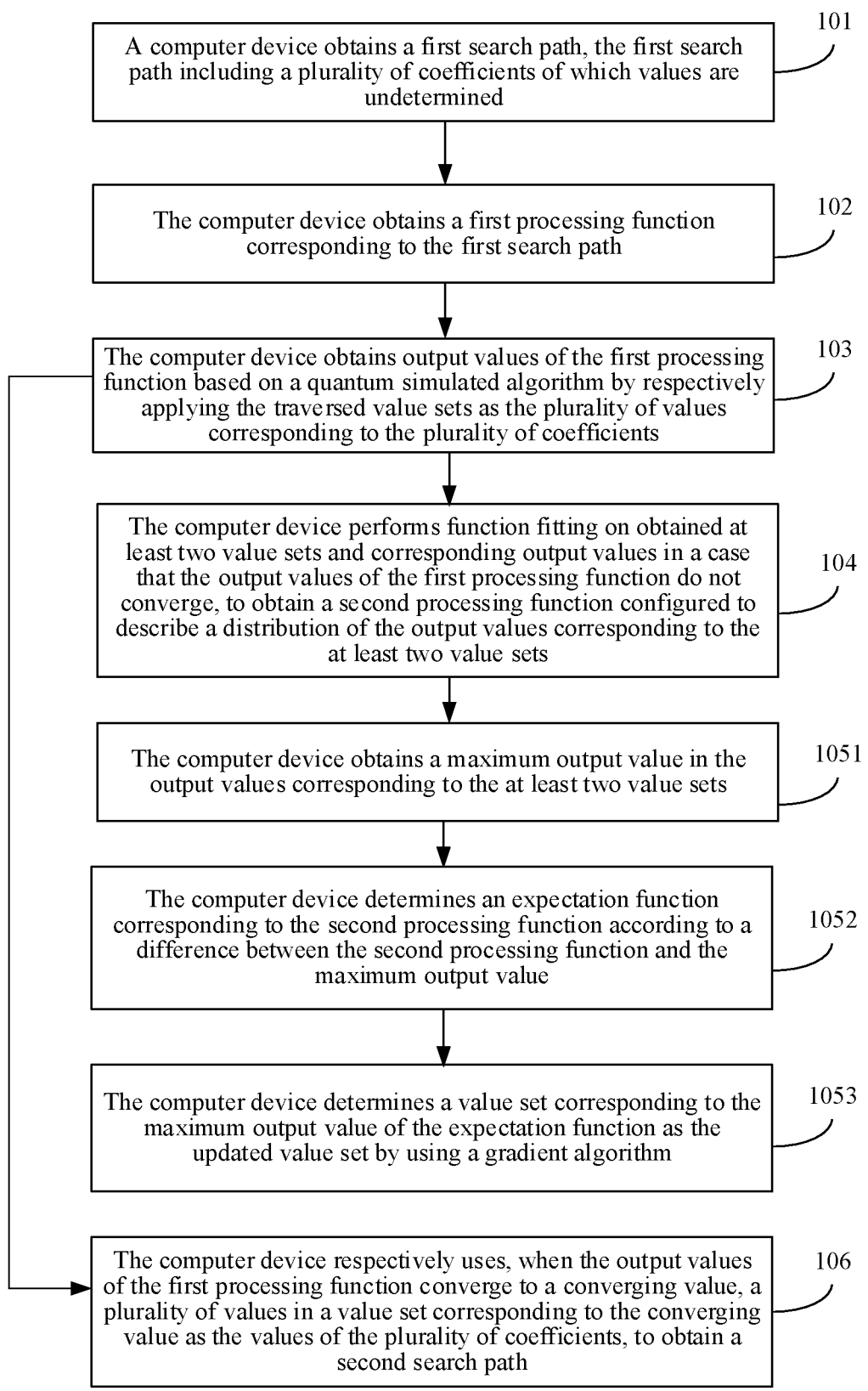
FIG. 3 is a flowchart of a method for obtaining a value set according to an embodiment of the present disclosure.

In one embodiment, referring to FIG. 3, the updated value set is obtained by using the following steps:

1051. The computer device obtains a maximum output value in the output values of the first processing function that correspond to the at least two value sets.

With regard to the expectation function, for the first processing function, if output values $f(x_{1:n})$ corresponding to n value sets are obtained, a current maximum output value can be defined as $f^*_n$:

$$f^*_n = \max_{m \leq n} f(x_m)$$

where n is a positive integer, and $f^*_n$ is used for representing the maximum output value in the n output values. When a new value set and corresponding output values (x, f(x)) are further obtained, a current maximum output value is either $f^*_n$, that is, $f^*_n > f(x)$, or f(x), that is, $f(x) \geq f^*_n$. In this way, the current maximum output value is increased by $(f(x)-f^*_n)^+$ according to the new value set. A mark "+" is defined as $a^+ = \max(a, 0)$.

1052. The computer device determines an expectation function corresponding to the second processing function according to a difference between the second processing function and the maximum output value.

The expectation function is a function for averaging a maximum between the difference and 0.

In one embodiment, the expectation function is defined as shown in the following formula (10):

$$EI_n = E_n[(f(x)-f^*_n)^+] \tag{10}$$

where n represents n output values currently determined, $EI_n$ represents an expectation function when the n output values are determined, $(f(x)-f^*_n)^+$ represents an increase in the current maximum output value by using the output value corresponding to the new value set, the maximum is 0 or $f(x)-f^*_n$, E represents averaging, and $E_n$ represents averaging when the n output values are determined.

The foregoing formula (7) is substituted into the formula (10), to obtain a simplified expectation function shown in the following formula (11):

$$EI_n(x) = [\Delta_n(x)]^+ + \sigma_n(x)\varphi\left(\frac{\Delta_n(x)}{\sigma_n(x)}\right) - |\Delta_n(x)|\Phi\left(\frac{\Delta_n(x)}{\sigma_n(x)}\right) \tag{11}$$

where $\Delta_n(x) = \mu_n(x) - f^*_n$, $\mu_n(x)$ represents an average value corresponding to the n output values, $\sigma_n(x)$ represents a standard deviation corresponding to the n output values, $\varphi$ is a density function, and $\Phi$ is a cumulative function.

1053. The computer device determines a value set corresponding to the maximum output value of the expectation function as the updated value set by using a gradient algorithm.

In one embodiment, according to the determined expectation function corresponding to the second processing function, an update rule of the value set is defined as shown in the following formula (12):

$$x_{n+1} = \mathrm{argmax} EI_n(x) \tag{12}$$

That is, when an output value of the foregoing expectation function is the maximum output value, the corresponding value set x is a newly obtained value set. In addition, when the output values of the expectation function converge to 0, it indicates that the output values corresponding to a plurality of known value sets already include a maximum, that is, converge to the maximum. In this case, the output values of the first processing function also converge.

Figure 4:
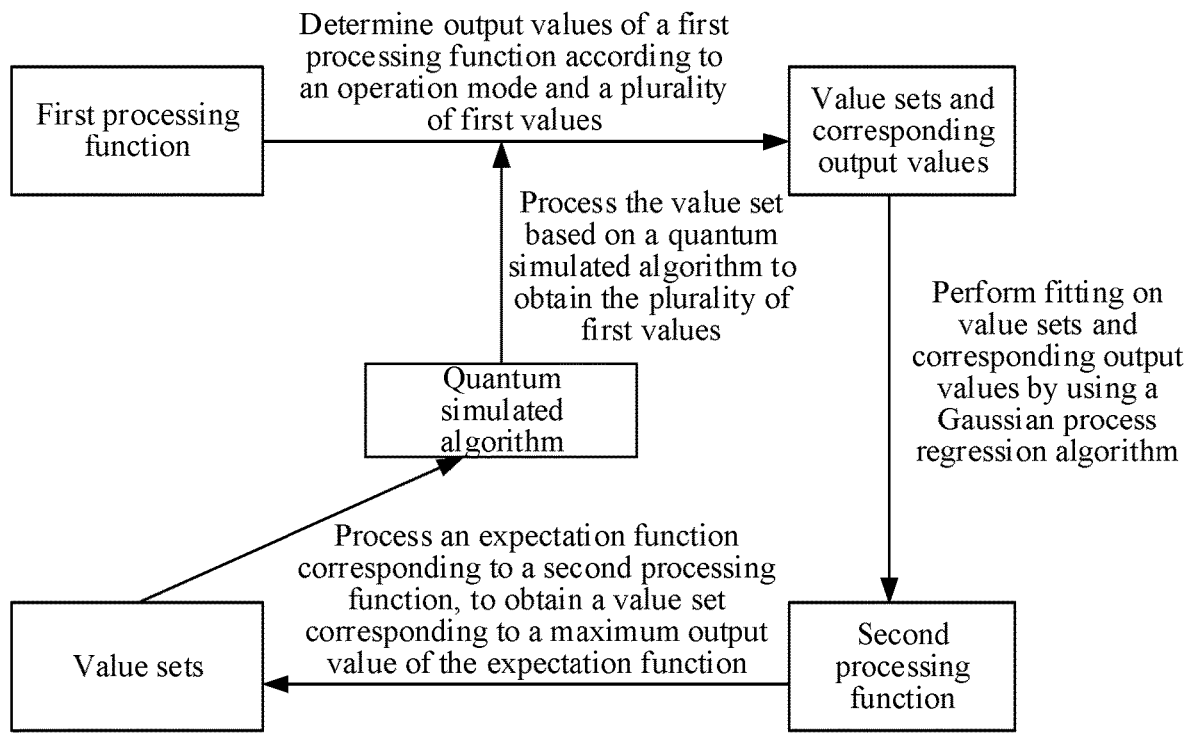
FIG. 4 is a schematic flowchart of a method for obtaining a value set according to an embodiment of the present disclosure.

In addition, FIG. 4 is a schematic flowchart of updating a value set, in which a value set is obtained, and a plurality of values in the value sets are processed based on a quantum simulated algorithm, to obtain first values corresponding to a plurality of subfunctions, output values of the first processing function are determined according to the first values corresponding to the plurality of subfunctions and an operation mode of determining the first processing function according to the plurality of subfunctions, value sets and corresponding output values are fitted according to a current value set and corresponding output values, and a previous value set and corresponding output values by using a Gaussian process regression algorithm, to obtain a second processing function, and an expectation function corresponding to the second processing function is processed, to obtain a value set corresponding to a maximum output value of the expectation function, which is used as one updated value set.

In some embodiments, a plurality of values in a first value set are preset, and the plurality of values are set randomly or empirically. Value sets other than the first value set are all obtained by using step 105.

106. The computer device respectively uses, when the output values of the first processing function converge, a plurality of values in value sets corresponding to the converging output values as the values of the plurality of coefficients, to obtain a second search path. In other words, the computer device respectively uses, when the output values of the first processing function converge to a converging value, a plurality of values in a value set corresponding to the converging value as the values of the plurality of coefficients, to obtain a second search path.

In this embodiment of the present disclosure, that the output values of the first processing function converge means that the output values corresponding to a plurality of value sets converge to a same value. Because the foregoing process of obtaining the output values of the first processing function is a cyclic process, when the output values corresponding to the plurality of value sets converge, a plurality of values in a finally obtained value set are used as the values of the plurality of coefficients respectively, and the plurality of values are substituted into the first search path to obtain the second search path. The data may be processed subsequently according to the second search path.

In this embodiment of the present disclosure, the second search path is a search path based on quantum computing. Because there is a linear superposition state in quantum computing, compared with the classical computing, quantum computing has a higher speed in processing data by using the second search path, so that the data processing efficiency can be improved.

In one embodiment, the obtained second search path is applied to a quantum computer, to resolve a problem of a Grover search (a quantum search algorithm) in quantum computing according to the obtained second search path. For the Grover search in quantum computing, assuming that there are n bits, and each bit corresponds to two states: 0 and 1, the n bits are encoded, so that $2^n$ objects can be encoded. In a worst case of a classical algorithm, $2^n$ attempts need to be made so as to find a target object. However, because the quantum computer can implement secondary acceleration, that is, the target object can be found by making only $2^{n/2}$ attempts at most.

The Grover search based on the AQC is an optimal search path designed for the following two given Hamiltonians H0 and H1.

$$H_0 = I - |\phi\rangle\langle\phi|, H_1 = I - |m\rangle\langle m|$$

where $$|\Phi\rangle = \frac{1}{2^{n/2}} \sum_{k=1}^{2^n-1} |i\rangle,$$

I is all identity matrix, and $|m\rangle$ is a target binary character string.

Figure 5:
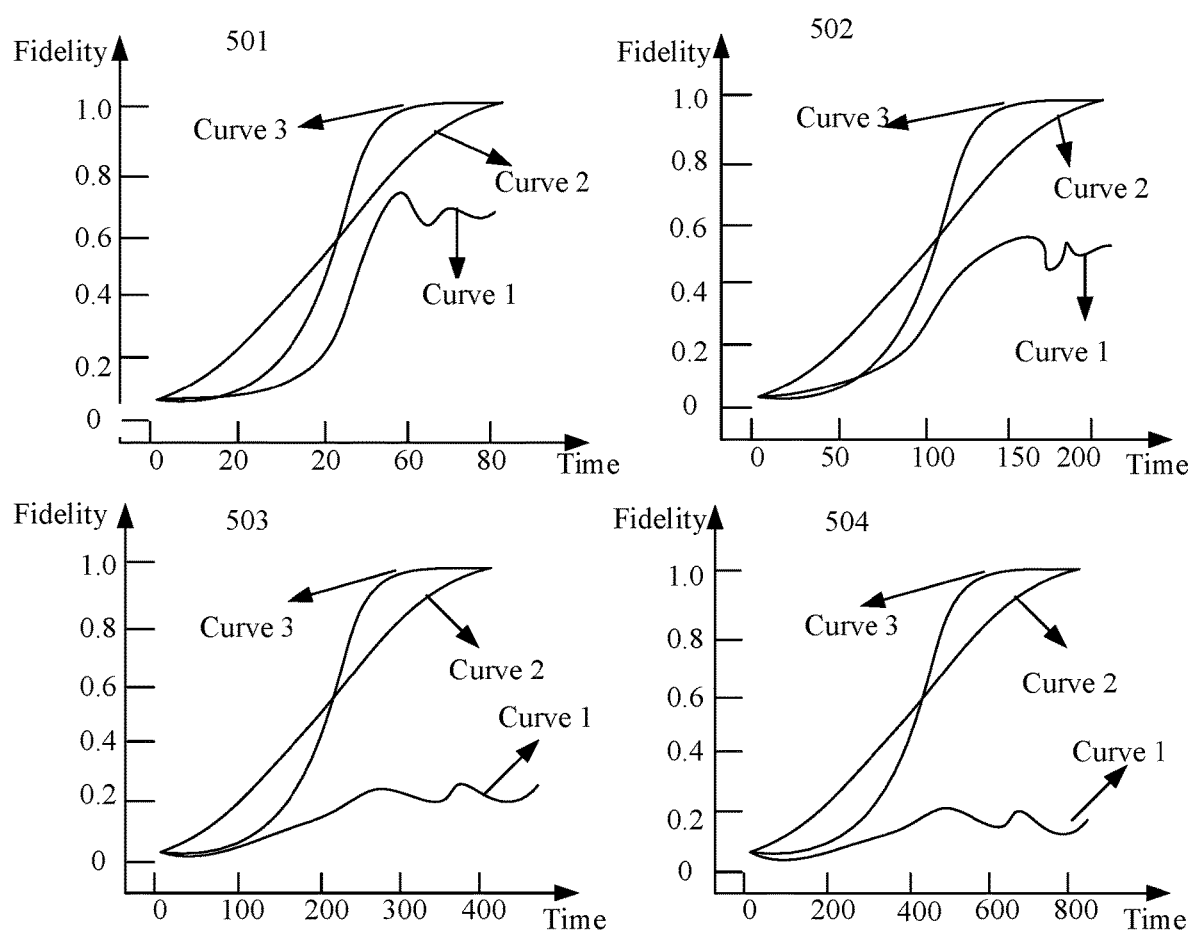
FIG. 5 is a schematic diagram of search effects based on a linear path, a nonlinear path, and a second search path according to an embodiment of the present disclosure.

A ground state of an initial state Hamiltonian H0 is evolved to a ground state of a final state Hamiltonian H1 by respectively using a conventional linear path, a Roland-Cerf path (a non-linear path), and the second search path obtained by using the foregoing steps. Schematic diagrams of evolution processes are shown in FIG. 5, in which an abscissa is an evolution time, an ordinate is a fidelity, a curve 1 is a curve corresponding to the linear path, a curve 2 is a curve corresponding to the Roland-Cerf path, and a curve 3 is a curve corresponding to the optimal search path. A schematic diagram 501 in FIG. 5 is a schematic diagram of evolution corresponding to 6 qubits, a schematic diagram 502 in FIG. 5 is a schematic diagram of evolution corresponding to 8 qubits, a schematic diagram 503 in FIG. 5 is a schematic diagram of evolution corresponding to 10 qubits, and a schematic diagram 504 in FIG. 5 is a schematic diagram of evolution corresponding to 12 qubits.

It can be learned from FIG. 5 that if the conventional linear path is used, the fidelity cannot reach 1 after the evolution ends, while if the Roland-Cerf path and the second search path are used, the fidelity can reach 1 after the evolution ends. In addition, compared with the Roland-Cerf path, the second search path enables the fidelity to reach 1 within a shorter time and at a higher speed, thereby improving the efficiency of AQC.

In addition, it can be further learned from FIG. 5 that as a quantity of qubits increases, an effect of performing evolution by using the linear path gradually becomes worse. This is because the linear path has a same rate at any time point. In this case, when there is a very small energy gap, energy of a quantum is easily excited to a high-energy state at the same rate, resulting in a failure to return to the ground state.

Figure 6:
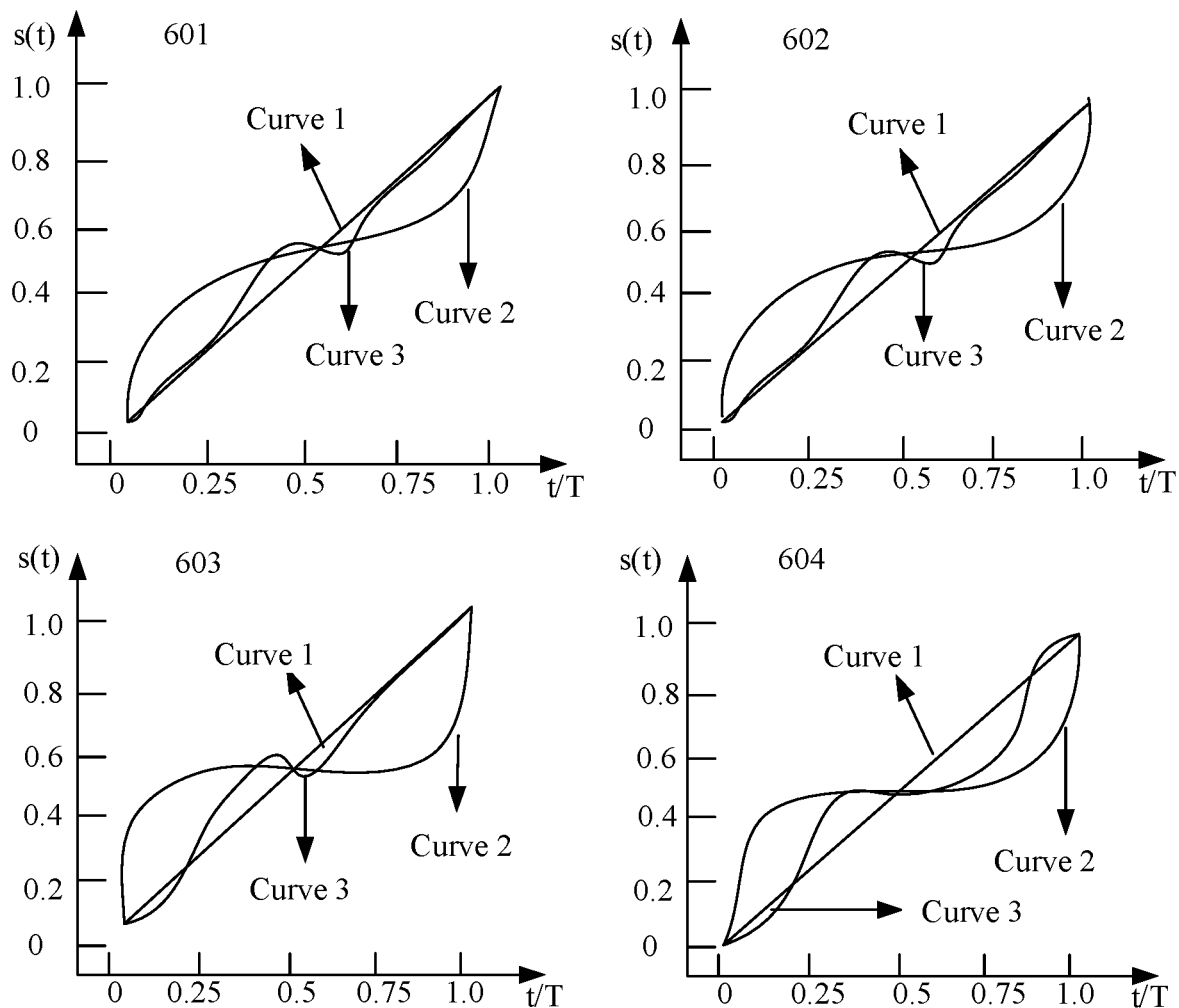
FIG. 6 is another schematic diagram of search effects based on a linear path, a nonlinear path, and a second search path according to an embodiment of the present disclosure.
Figure 7:
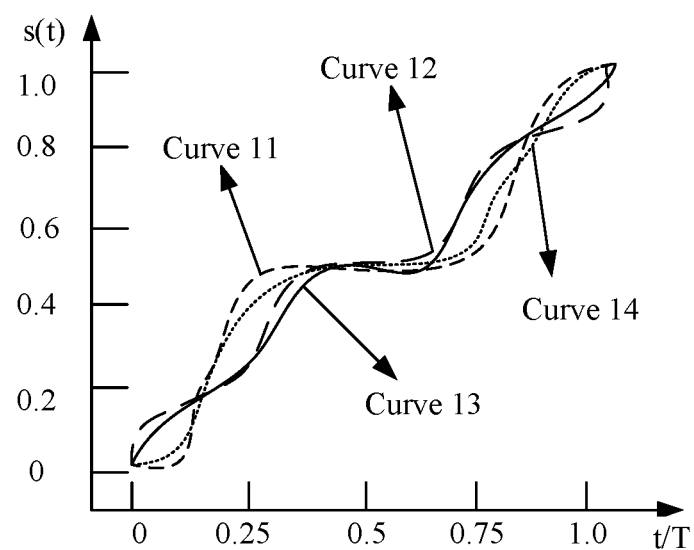
FIG. 7 is a schematic diagram of a search effect based on a second search path according to an embodiment of the present disclosure.

The foregoing evolution processes shown in FIG. 5 are expressed in another form, as shown in FIG. 6. In FIG. 6, an abscissa is t/T, and an ordinate is a path. A curve 1 is a curve corresponding to the linear path, a curve 2 is a curve corresponding to the Roland-Cerf path, and a curve 3 is a curve corresponding to the second search path. A schematic diagram 601 in FIG. 6 is a schematic diagram of evolution corresponding to 6 qubits, a schematic diagram 602 in FIG. 6 is a schematic diagram of evolution corresponding to 8 qubits, a schematic diagram 603 in FIG. 6 is a schematic diagram of evolution corresponding to 10 qubits, and a schematic diagram 604 in FIG. 6 is a schematic diagram of evolution corresponding to 12 qubits. FIG. 7 is a schematic diagram of respectively evolving 6 qubits, 8 qubits, 10 qubits, and 12 qubits by using the second search path. The 6 qubits correspond to a curve 11, the 8 qubits correspond to a curve 12, the 10 qubits correspond to a curve 13, and the 12 qubits correspond to a curve 14.

It can be learned from FIG. 6 and FIG. 7 that the curve corresponding to the second search path becomes relatively flat at $$s(t) = \frac{1}{2}.$$

This is because the energy gap at $$s = \frac{1}{2}$$

is the smallest, which conforms to physical laws of quantum mechanics.

In the related art, the first search path includes a plurality of coefficients of which values are undetermined, and the values of the plurality of coefficients are respectively determined by using a reinforcement learning model, to obtain the second search path. However, the reinforcement learning model tries a plurality of optional values of each coefficient to finally determine an optional value. In the process of obtaining the second search path, if each coefficient of which a value is undetermined corresponds to a large quantity of optional values, the reinforcement learning model needs to make a plurality of attempts, resulting in relatively low efficiency of determining the values, and further resulting in relatively low efficiency of obtaining the second search path.

In the method provided in the embodiments of the present disclosure, in the process of traversing the value sets of the first search path, different values of the plurality of coefficients can be respectively processed through one traversal, and when the output values of the first processing function converge, a plurality of values in the value sets corresponding to the converging output values are used as the values of the plurality of coefficients respectively, to obtain the second search path. Therefore, only a small quantity of traversals are needed to cause the output values of the first processing function to converge, to quickly obtain accurate values of the plurality of coefficients, thereby improving the efficiency of obtaining the second search path.

In addition, when the output values of the first processing function do not converge, the value set is updated to obtain new output values of the first processing function according to the updated value set. In the process of updating the value set, a Gaussian process regression algorithm is used. For a continuous function that lacks a specific symmetric structure and a geometric structure and of which gradient information is difficult to obtain, the Gaussian process regression algorithm only requires a relatively short time to finish processing such a complex function, and has high processing efficiency. In addition, the Gaussian process regression algorithm can process a function including noise, can process a plurality of types of functions, and has a wide application range. In this case, when the second search path is obtained, the Gaussian process regression algorithm can be used for fast processing even if a processing function corresponding to the second search path is a relatively complex function.

In addition, due to relatively high time costs and economic costs when a complex function is processed in classical computing, for a quantum system, when the quantum system undergoes a quantum phase transition, the quantum system becomes more complex, which means that a function corresponding to the quantum system becomes a more complex function. The complex function can be fast processed by using the method in the present disclosure, thereby reducing the time costs and the economic costs.

In addition, because the reinforcement learning model can process only discrete data, and cannot directly process a continuous function, the search path obtained by using the reinforcement learning model is only a local optimal search path. However, the continuous function can be processed by using the method for obtaining a search path in the present disclosure, so that the obtained second search path is a global optimal search path.

In addition, in the method provided in the embodiments of the present disclosure, the values of the plurality of coefficients of the first search path can be determined, to obtain the second search path. Compared with search paths obtained when other values are used as the values of the plurality of coefficients, the second search path is used for processing the data at a highest data processing speed.

Figure 8:
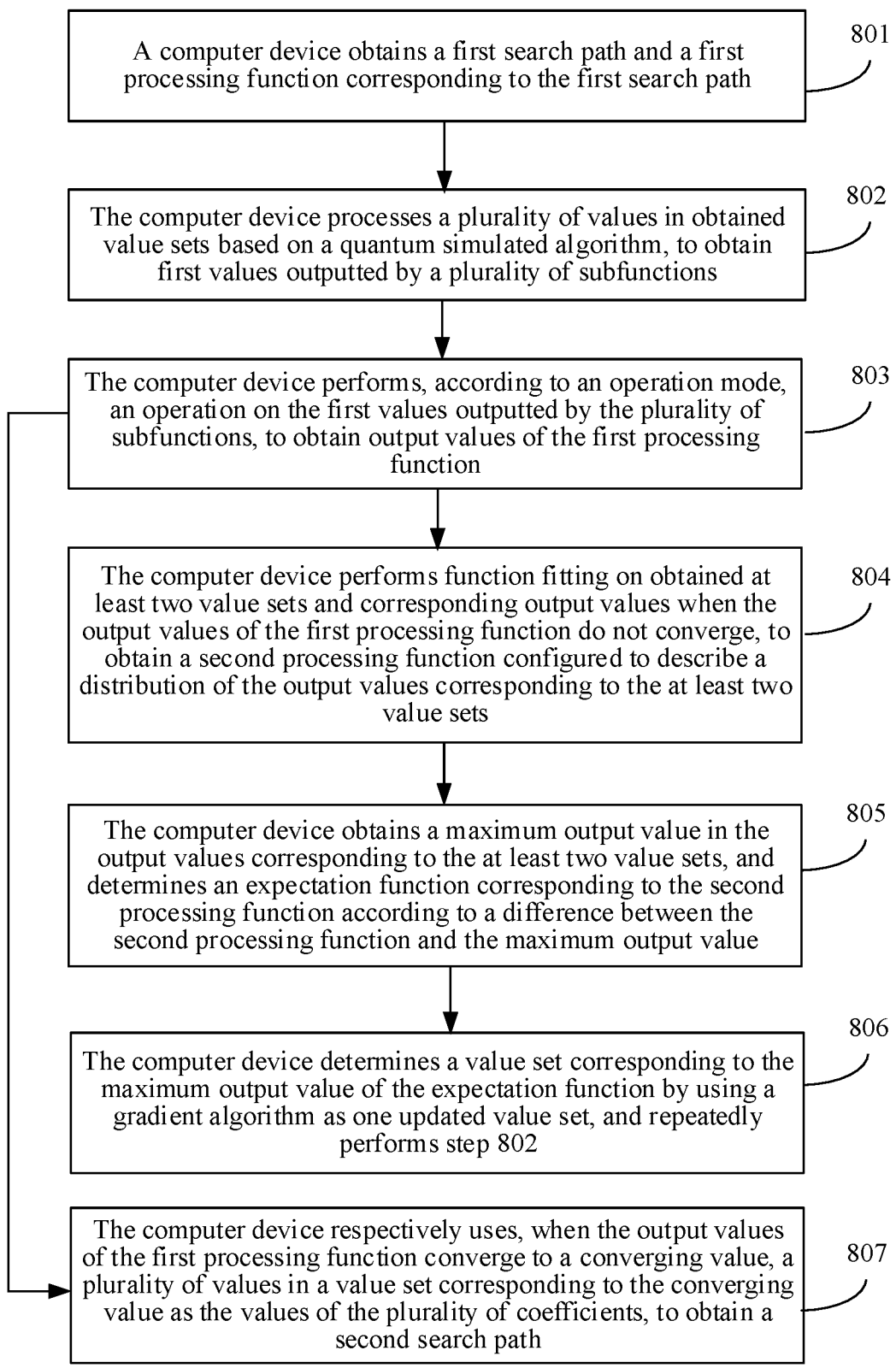
FIG. 8 is a flowchart of another method for obtaining a search path based on a quantum simulated algorithm according to an embodiment of the present disclosure.

FIG. 8 is a flowchart of a method for obtaining a search path based on a quantum simulated algorithm according to an embodiment of the present disclosure. This embodiment of the present disclosure is executed by a computer device. Referring to FIG. 8, the method includes the following steps:

801. A computer device obtains a first search path and a first processing function corresponding to the first search path.

An implementation of obtaining the first search path and the corresponding first processing function in step 801 is similar to the implementation of step 101 and step 102 in the foregoing embodiment shown in FIG. 1. Details are not described herein again.

802. The computer device processes a plurality of values in obtained value sets based on a quantum simulated algorithm, to obtain first values outputted by a plurality of subfunctions.

The quantum simulated algorithm includes a plurality of subfunctions and an operation mode of determining the first processing function according to the plurality of subfunctions. The plurality of subfunctions include a plurality of coefficients of which values are undetermined. In some embodiments, the plurality of coefficients are the same as the plurality of coefficients of which values are undetermined included in the first processing function, or the plurality of coefficients are obtained by performing an operation on the plurality of coefficients of which values are undetermined included in the first processing function. In some embodiments, each subfunction includes coefficients of which values are undetermined. Alternatively, a reference quantity of subfunctions in the plurality of subfunctions includes coefficient of which values are undetermined, but subfunctions other than the reference quantity of subfunctions do not include coefficients of which values are undetermined.

In addition, in this embodiment of the present disclosure, the plurality of values in the obtained value sets are processed based on the quantum simulated algorithm, to obtain first values outputted by the plurality of subfunctions. In this way, the first value outputted by each subfunction included in the quantum simulated algorithm has a corresponding physical meaning. For example, if the first values outputted by the subfunctions represent a quantum speed, a quantum mass, and the like, the quantum simulated algorithm represents the first processing function as subfunctions corresponding to a plurality of physical quantities.

803. The computer device performs, according to an operation mode, an operation on the first values outputted by the plurality of subfunctions, to obtain output values of the first processing function.

After obtaining the output values of the first processing function, the computer device obtains the output values of the first processing function that correspond to the traversed at least two value sets, and determines whether the output values of the first processing function converge. When the output values of the first processing function converge, step 807 is performed. When the output values of the first processing function do not converge, step 804 is performed.

804. The computer device performs function fitting on the obtained at least two value sets and the corresponding output values when the output values of the first processing function do not converge, to obtain a second processing function configured to describe a distribution of the output values corresponding to the at least two value sets.

An implementation of obtaining the second processing function in step 804 is similar to the implementation of step 104 in the foregoing embodiment shown in FIG. 1. Details are not described herein again.

805. The computer device obtains a maximum output value in the output values corresponding to the at least two value sets, and determines an expectation function corresponding to the second processing function according to a difference between the second processing function and the maximum output value.

806. The computer device determines a value set corresponding to the maximum output value of the expectation function as an updated value set by using a gradient algorithm, and repeatedly performs step 802.

An implementation of determining the expectation function in step 805 and an implementation of obtaining the updated value set in step 806 are similar to the implementation of step 105 in the foregoing embodiment shown in FIG. 1. Details are not described herein again.

807. The computer device respectively uses, when the output values of the first processing function converge, a plurality of values in value sets corresponding to the converging output values as the values of the plurality of coefficients, to obtain a second search path.

In the method for obtaining a search path provided in the embodiments of the present disclosure, in the process of traversing the value sets of the first search path, different values of the plurality of coefficients can be respectively processed through one traversal, and when the output values of the first processing function converge, a plurality of values in the value sets corresponding to the converging output values are used as the values of the plurality of coefficients respectively, to obtain the second search path. Therefore, only a small quantity of traversals are needed to cause the output values of the first processing function to converge, to quickly obtain accurate values of the plurality of coefficients, thereby improving the efficiency of obtaining the second search path.

The foregoing method for obtaining a search path based on a quantum simulated algorithm shown in FIG. 1 or FIG. 8 is applicable to a search scenario in which a plurality of pieces of candidate data are searched for target data by using a search path. The data search method based on a quantum simulated algorithm is described below by using an example in which the data search method based on a quantum simulated algorithm is applicable to a search scenario.

Figure 9:
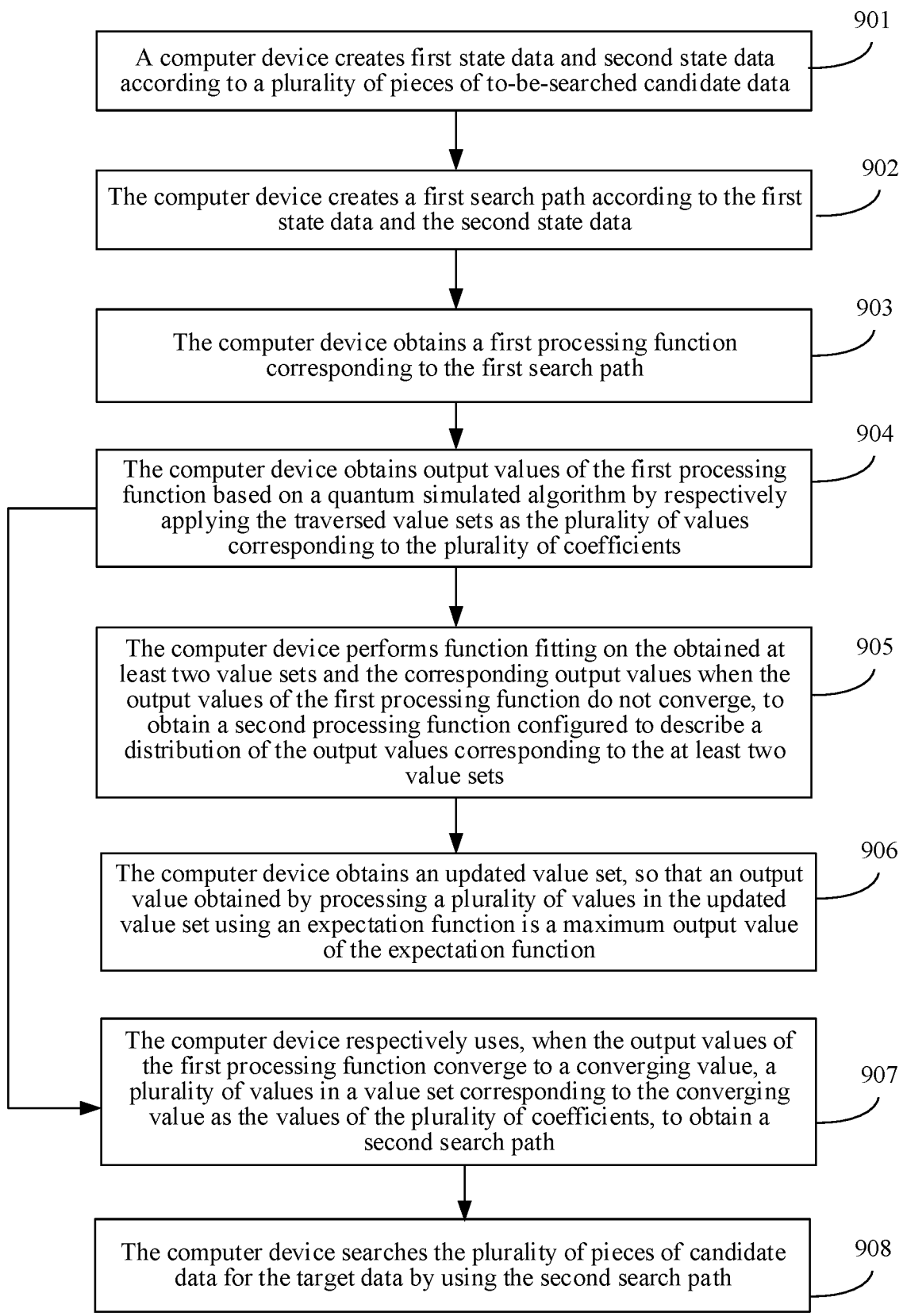
FIG. 9 is a flowchart of a data search method based on a quantum simulated algorithm according to an embodiment of the present disclosure.

FIG. 9 is a flowchart of a data search method based on a quantum simulated algorithm according to an embodiment of the present disclosure. Referring to FIG. 9, this embodiment of the present disclosure is executed by a computer device. The method includes the following steps:

901. The computer device creates first state data and second state data according to a plurality of pieces of candidate data to be searched.

In some embodiments, the candidate data is items, images or other data, and the candidate data is data in different forms according to different actual search scenarios, which is not limited in this embodiment of the present disclosure. The first state data is used for describing a state of the plurality of pieces of candidate data when a search is not started yet on the plurality of pieces of candidate data, and the second state data is used for describing a state of the plurality of pieces of candidate data when the target data has been found.

A first state corresponding to the first state data is a state in which the plurality of pieces of candidate data have a same selection probability, and a second state corresponding to the second state data is a state in which target data that meets a search condition has been found.

That is, when the plurality of pieces of candidate data are in the first state, a search is not started yet on the plurality of pieces of candidate data, and all the selection probabilities of the plurality of pieces of candidate data are the same. That is, when the computer device searches the plurality of pieces of candidate data for the first time, a probability of selecting any candidate data in the plurality of pieces of candidate data is the same. When the plurality of pieces of candidate data are in the second state, the target data has been found, and the probability of selecting the target data is 1. That is, when the computer device searches the plurality of pieces of candidate data for the last time, the target data is necessarily selected.

For example, there are n pieces of candidate data. When searching the n pieces of candidate data for the first time, the computer device selects any piece of candidate data from the n pieces of candidate data, and a probability of selecting the piece of candidate data is 1/n.

In one embodiment, the first state data includes a selection probability of a plurality of pieces of candidate data, the second state data includes a reference probability, the selection probability of the plurality of pieces of candidate data is determined according to a quantity of the pieces of candidate data, and the reference probability is 1. For example, if there are 20 pieces of candidate data, and one piece of target data needs to be selected from the 20 pieces of candidate data, it can be determined that the selection probability included in the first state data is 1/20.

In one embodiment, if the plurality of pieces of candidate data are located at different positions, when the plurality of pieces of candidate data are searched for the target data, a search needs to be started from any initial position, and an end position is a position of the target data. In this way, the first state data includes start position information, and the second state data includes end position information. In the subsequent search process, if the found position information is the same as the end position information, it indicates that the target data is found.

902. The computer device creates a first search path according to the first state data and the second state data.

An implementation of creating the first search path in step 902 is similar to the implementation of obtaining the first search path in the foregoing step 101, and differs from the implementation of obtaining the first search path in the foregoing step 101 in that in addition to that the first search path includes a plurality of coefficients of which values are undetermined, a start point of the first search path refers to the first state, and an end point refers to the second state.

In one embodiment, the computer device creates the first search path according to the first state data, the second state data, and a target search duration. The first search path further includes the target search duration, the target search duration being a duration required for converting the first state into the second state. In some embodiments, the target search duration is any duration, for example, 1 minute, 2 minutes, or another duration.

An example in which the target search duration is T, the first state data is (0, 1), and the second state data is (T, 0) is used. The first search path is created as s(t)=1−t/T. The first search path meets requirements of the target search duration, the first state data, and the second state data.

A form of the first search path s(t)=1−t/T is transformed to obtain a first search path shown in the following formula (4):

$$s(t) = \frac{t}{T} + \sum_{j=1}^{+\infty} b_j \sin\frac{j\pi t}{T} \tag{4}$$

where T is the target search duration, t is an independent variable, $b_j$ is a coefficient of which a value is undetermined, a value range of j is from 1 to positive infinity, and j is a positive integer.

This embodiment of the present disclosure is described by merely using an example in which the first state data is (0, 1), the second state data is (T, 0), and the created first search path is $s(t)=1-t/T$. In another embodiment, another search path that meets the first state data and the second state data is created.

903. The computer device obtains a first processing function corresponding to the first search path. The first processing function includes the plurality of coefficients, output values of the first processing function are determined by the first search path, convergence of the output values of the first processing function indicates that the values of the plurality of coefficients meet a target.

904. The computer device obtains output values of the first processing function based on a quantum simulated algorithm when the values of the plurality of coefficients are a plurality of values in value sets.

905. The computer device performs function fitting on the obtained at least two value sets and the corresponding output values when the output values of the first processing function do not converge, to obtain a second processing function configured to describe a distribution of the output values corresponding to the at least two value sets.

906. The computer device obtains an updated value set, so that an output value obtained by processing a plurality of values in the updated value set using an expectation function is a maximum output value of the expectation function.

907. The computer device respectively uses, when the output values of the first processing function converge, a plurality of values in value sets corresponding to the converging output values as the values of the plurality of coefficients, to obtain a second search path.

An implementation of determining the second search path in step 903 to step 907 is similar to the implementation of determining the second search path in step 102 to step 106 in the embodiment shown in FIG. 1. Details are not described herein again.

908. The computer device searches the plurality of pieces of candidate data for the target data by using the second search path.

In this embodiment of the present disclosure, the computer device searches the plurality of pieces of candidate data for the target data by using the second search path. If the found candidate data meets a search condition, it indicates that the candidate data is the target data.

In one embodiment, the plurality of pieces of candidate data have different types, and the search condition includes a target type. The computer device searches, by using the second search path, the plurality of pieces of candidate data for the target data that meets the target type.

For example, if the pieces of candidate data are 20 candidate items, one target item needs to be selected from the 20 candidate items. If the search condition is a target item type, a target item of the target item type needs to be found from the 20 candidate items. In the search process, a search is started from a starting point of the search path. In this case, a probability that the target item can be selected during the first search is 1/20, and if the target item is selected during the first search, the probability becomes 1, and the search is ended; if the target item is not found during the first search, a probability that the target item can be selected during the second search is 1/19, and if the target item is selected during the second search, the probability becomes 1, and the search is ended; if the target item is still not found during the second search, a probability that the target item can be selected during the third search becomes 1/18, and the remaining candidate items are continuously searched until the target item is found.

In some embodiments, the plurality of pieces of candidate data include data of the same type, and the search condition includes a data identifier or another data feature that can uniquely represent the target data.

A form of the candidate data and the search condition are not limited in this embodiment of the present disclosure. According to actual application scenarios, the candidate data is data in a plurality of forms, and the search condition is determined according to the form of the candidate data.

In the method provided in the embodiments of the present disclosure, in the process of traversing the value sets of the first search path, different values of the plurality of coefficients can be respectively processed through one traversal, and when the output values of the first processing function converge, a plurality of values in the value sets corresponding to the converging output values are used as the values of the plurality of coefficients respectively, to obtain the second search path. Therefore, only a small quantity of traversals are needed to cause the output values of the first processing function to converge, to quickly obtain accurate values of the plurality of coefficients, thereby improving the efficiency of obtaining the second search path. In addition, because the first search path is created according to the first state data and the second state data corresponding to the plurality of pieces of candidate data, the obtained second search path is applicable to the plurality of pieces of candidate data, and the target data may be quickly found from the plurality of pieces of candidate data by using the second search path.

In addition, because the obtained second search path is a search path with the shortest search time and the highest search speed, in the process of searching for the target data by using the second search path, the target data may be quickly found from the plurality of pieces of candidate data according to the search condition, thereby improving the data search efficiency. In addition, compared with a data search mode in classical computing, the second search path is a data search mode based on quantum computing, and the efficiency of searching for the target data by using the second search path is higher than the efficiency of searching for the target data by using classical computing.

Figure 10:
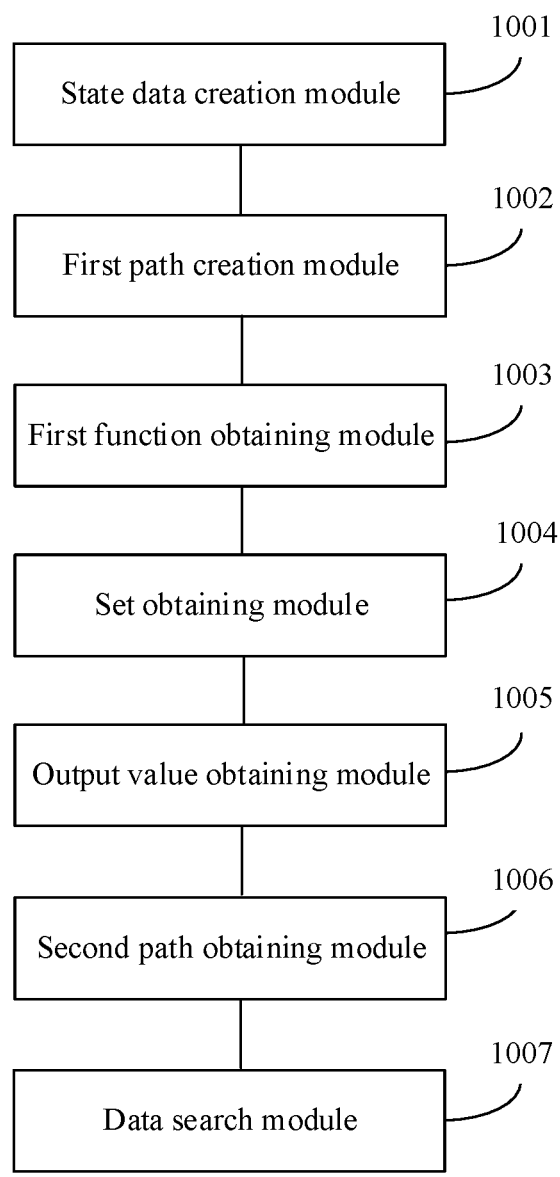
FIG. 10 is a schematic structural diagram of a data search apparatus according to an embodiment of the present disclosure.

FIG. 10 is a schematic structural diagram of a data search apparatus according to an embodiment of the present disclosure. Referring to FIG. 10, the apparatus includes:

a state data creation module 1001, configured to create first state data and second state data according to a plurality of pieces of candidate data to be searched, a first state corresponding to the first state data being a state in which the plurality of pieces of candidate data have a same selection probability, and a second state corresponding to the second state data being a state in which target data that meets a search condition has been found;

a first path creation module 1002, configured to create a first search path according to the first state data and the second state data, a starting point of the first search path referring to the first state, an ending point referring to the second state, and the first search path including a plurality of coefficients of which values are undetermined;

a first function obtaining module 1003, configured to obtain a first processing function corresponding to the first search path, the first processing function including the plurality of coefficients, output values of the first processing function being determined by the first search path, convergence of the output values of the first processing function indicating that the values of the plurality of coefficients meet a target;

a set obtaining module 1004, configured to traverse at least two value sets of the first search path, each value set including a plurality of values corresponding to the plurality of coefficients, a plurality of values in different value sets being not completely the same;

an output value obtaining module 1005, configured to obtain the output values of the first processing function based on a quantum simulated algorithm by respectively applying the traversed value sets as the plurality of values corresponding to the plurality of coefficients;

a second path obtaining module 1006, configured to respectively use, when the output values of the first processing function converge, a plurality of values in value sets corresponding to the converging output values as the values of the plurality of coefficients, to obtain a second search path; and a data search module 1007, configured to search the plurality of pieces of candidate data for the target data by using the second search path.

In the apparatus provided in the embodiments of the present disclosure, in the process of traversing the value sets of the first search path, different values of the plurality of coefficients can be respectively processed through one traversal, and when the output values of the first processing function converge, a plurality of values in the value sets corresponding to the converging output values are used as the values of the plurality of coefficients respectively, to obtain the second search path. Therefore, only a small quantity of traversals are needed to cause the output values of the first processing function to converge, to quickly obtain accurate values of the plurality of coefficients, thereby improving the efficiency of obtaining the second search path. In addition, because the first search path is created according to the first state data and the second state data corresponding to the plurality of pieces of candidate data, the obtained second search path is applicable to the plurality of pieces of candidate data, and the target data may be quickly found from the plurality of pieces of candidate data by using the second search path.

Figure 11:
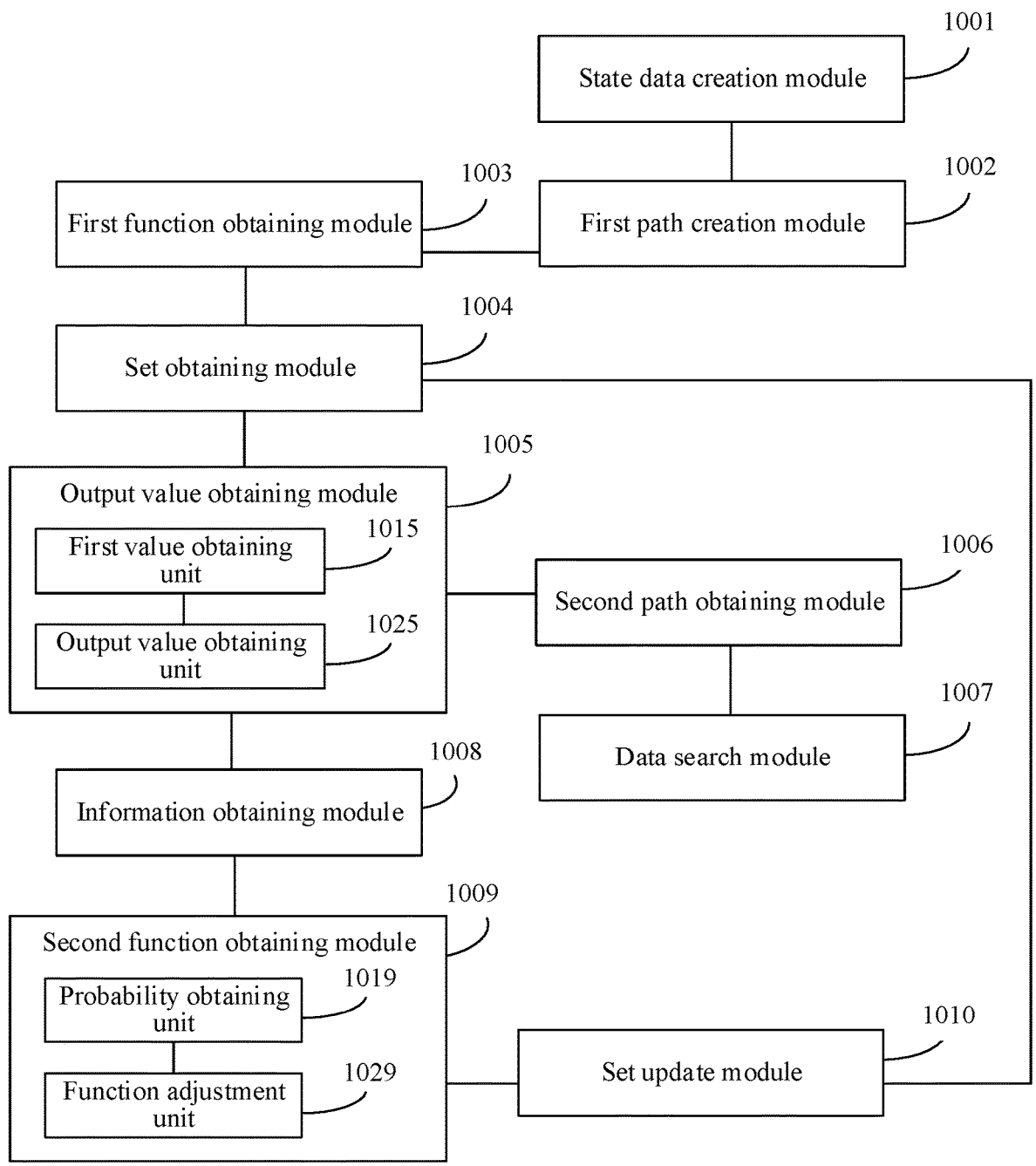
FIG. 11 is a schematic structural diagram of another data search apparatus according to an embodiment of the present disclosure.

In one embodiment, referring to FIG. 11, the apparatus further includes:

an information obtaining module 1008, configured to obtain, when the output values of the first processing function do not converge, at least two value sets that have been traversed and output values of the first processing function that correspond to the at least two value sets;

a second function obtaining module 1009, configured to perform function fitting on the at least two value sets and the corresponding output values to obtain a second processing function, the second processing function being configured to describe a distribution of the output values corresponding to the at least two value sets, and the second processing function including the plurality of coefficients; and a set update module 1010, configured to obtain an updated value set, so that an output value obtained by processing a plurality of values in the updated value set using an expectation function is a maximum output value of the expectation function, the expectation function being configured to describe an expected return of the second processing function.

In another embodiment, referring to FIG. 11, the second function obtaining module 1009 includes:

a probability obtaining unit 1019, configured to obtain a condition probability corresponding to the at least two value sets when the at least two value sets meet a Gaussian distribution, the condition probability being a probability of obtaining the second processing function based on the at least two value sets and the corresponding output values when the distribution of the output values corresponding to the at least two value sets meets the Gaussian distribution; and a function adjustment unit 1029, configured to adjust the obtained second processing function according to the at least two value sets, the corresponding output values, and the condition probability, to obtain the adjusted second processing function.

In another embodiment, referring to FIG. 11, the set update module 1010 is further configured to:

obtain a maximum output value in the output values of the first processing function that correspond to the at least two value sets;

determine the expectation function corresponding to the second processing function according to a difference between the second processing function and the maximum output value, the expectation function being a function for averaging a maximum between the difference and 0; and determine a value set corresponding to the maximum output value of the expectation function as the updated value set by using a gradient algorithm.

In another embodiment, referring to FIG. 11, the probability obtaining unit 1019 is further configured to:

obtain an average value and a variance that correspond to the at least two value sets when the at least two value sets meet the Gaussian distribution; and obtain the condition probability corresponding to the at least two value sets according to the average value and the variance.

In another embodiment, referring to FIG. 11, the quantum simulated algorithm includes a plurality of subfunctions and an operation mode of determining the first processing function according to the plurality of subfunctions, and the output value obtaining module 1005 includes:

a first value obtaining unit 1015, configured to process the plurality of values in the traversed value sets based on the quantum simulated algorithm, to respectively obtain first values outputted by the plurality of subfunctions; and an output value obtaining unit 1025, configured to perform, according to the operation mode, an operation on the first values outputted by the plurality of subfunctions, to obtain the output values of the first processing function.

In another embodiment, the first path creation module 1002 is further configured to:

create the first search path according to the first state data, the second state data, and a target search duration, the first search path further including the target search duration, and the target search duration being a duration required for converting the first state into the second state.

In another embodiment, the plurality of pieces of candidate data have different types, the search condition includes a target type, and the data search module 1007 is further configured to:

search, by using the second search path, the plurality of pieces of candidate data for the target data that meets the target type.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure further provides a computer device. The computer device includes a processor and a memory, the memory storing at least one piece of program code, the at least one piece of program code being loaded by the processor to perform the following operations:

creating first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found;

creating a first search path according to the first state data and the second state data, a starting point of the first search path referring to the first state, an ending point referring to the second state, and the first search path including a plurality of coefficients of which values are undetermined;

obtaining a first processing function corresponding to the first search path, the first processing function including the plurality of coefficients, output values of the first processing function being determined by the first search path, convergence of the output values of the first processing function indicating that the values of the plurality of coefficients meet a target;

traversing at least two value sets of the first search path, each value set including a plurality of values corresponding to the plurality of coefficients, a plurality of values in different value sets being not completely the same;

obtaining the output values of the first processing function based on a quantum simulated algorithm by respectively applying the traversed value sets as the plurality of values corresponding to the plurality of coefficients;

respectively using, when the output values of the first processing function converge, a plurality of values in value sets corresponding to the converging output values as the values of the plurality of coefficients, to obtain a second search path; and searching the plurality of pieces of candidate data for the target data by using the second search path.

In one embodiment, the at least one piece of program code is loaded by the processor to perform the following operations:

obtaining, when the output values of the first processing function do not converge, at least two value sets that have been traversed and output values of the first processing function that correspond to the at least two value sets;

performing function fitting on the at least two value sets and the corresponding output values to obtain a second processing function, the second processing function being configured to describe a distribution of the output values corresponding to the at least two value sets, and the second processing function including the plurality of coefficients; and obtaining an updated value set, so that an output value obtained by processing a plurality of values in the updated value set using an expectation function is a maximum output value of the expectation function, the expectation function being configured to describe an expected return of the second processing function.

In one embodiment, the at least one piece of program code is loaded by the processor to perform the following operations:

obtaining a condition probability corresponding to the at least two value sets when the at least two value sets meet a Gaussian distribution, the condition probability being a probability of obtaining the second processing function based on the at least two value sets and the corresponding output values when the distribution of the output values corresponding to the at least two value sets meets the Gaussian distribution; and adjusting the obtained second processing function according to the at least two value sets, the corresponding output values, and the condition probability, to obtain the adjusted second processing function.

In one embodiment, the at least one piece of program code is loaded by the processor to perform the following operations:

obtaining a maximum output value in the output values of the first processing function that correspond to the at least two value sets;

determining the expectation function corresponding to the second processing function according to a difference between the second processing function and the maximum output value, the expectation function being a function for averaging a maximum between the difference and 0; and determining a value set corresponding to the maximum output value of the expectation function as the updated value set by using a gradient algorithm.

In one embodiment, the at least one piece of program code is loaded by the processor to perform the following operations:

obtaining an average value and a variance that correspond to the at least two value sets when the at least two value sets meet the Gaussian distribution; and obtaining the condition probability corresponding to the at least two value sets according to the average value and the variance.

In one embodiment, the quantum simulated algorithm includes a plurality of subfunctions and an operation mode of determining the first processing function according to the plurality of subfunctions, and the at least one piece of program code is loaded by the processor to perform the following operations:

processing the plurality of values in the traversed value sets based on the quantum simulated algorithm, to respectively obtain first values outputted by the plurality of subfunctions; and performing, according to the operation mode, an operation on the first values outputted by the plurality of subfunctions, to obtain the output values of the first processing function.

In one embodiment, the at least one piece of program code is loaded by the processor to perform the following operation:

creating the first search path according to the first state data, the second state data, and a target search duration, the first search path further including the target search duration, and the target search duration being a duration required for converting the first state into the second state.

In one embodiment, the plurality of pieces of candidate data have different types, the search condition includes a target type, and the at least one piece of program code is loaded by the processor to perform the following operation:

searching, by using the second search path, the plurality of pieces of candidate data for the target data that meets the target type.

Figure 12:
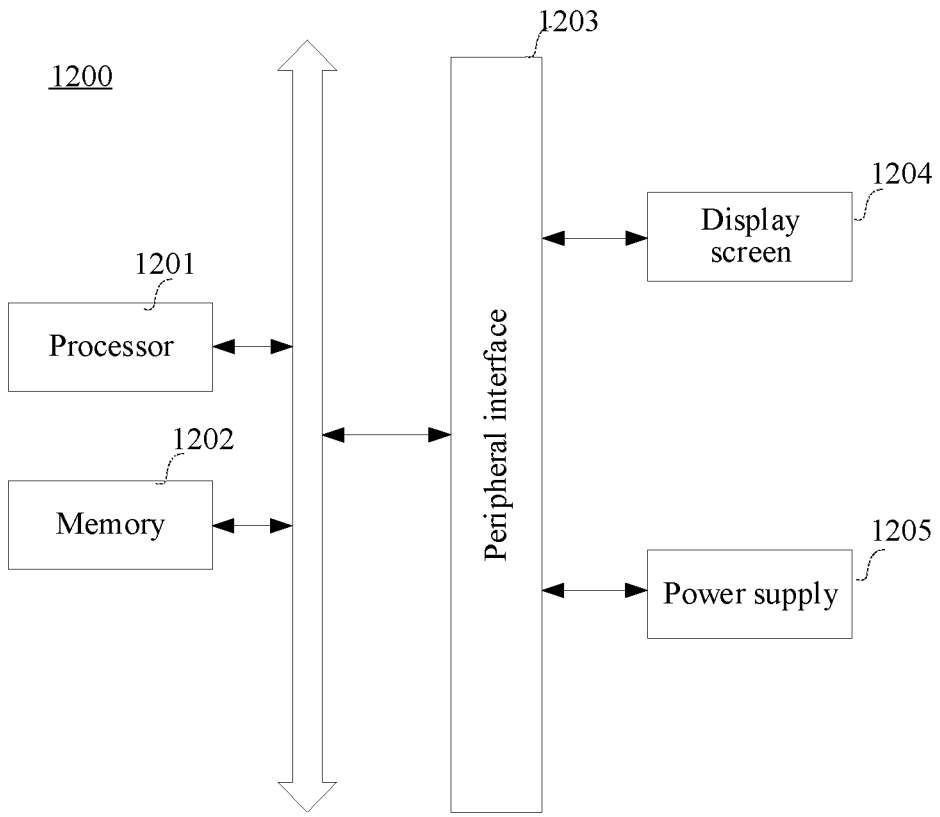
FIG. 12 is a schematic structural diagram of a terminal according to an embodiment of the present disclosure.

A description is made below by using an example in which the computer device is a terminal. FIG. 12 is a schematic structural diagram of a terminal 1200 according to an exemplary embodiment of the present disclosure. The terminal 1200 is configured to perform steps performed by the terminal in the foregoing data search method based on a quantum simulated algorithm.

Generally, the terminal 1200 includes a processor 1201 and a memory 1202.

The processor 1201 may include one or more processing cores, for example, a 4-core processor or an 8-core processor. The processor 1201 may be implemented in at least one hardware form of a digital signal processor (DSP), a field-programmable gate array (FPGA), and a programmable logic array (PLA). The processor 1201 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is configured to be responsible for rendering and drawing content that a display needs to display. In some embodiments, the processor 1201 may further include an artificial intelligence (AI) processor. The AI processor is configured to process a computing operation related to machine learning.

The memory 1202 may include one or more computer-readable storage media. The computer-readable storage media may be non-transient. The memory 1202 may further include a high-speed random access memory (RAM) and a non-volatile memory, for example, one or more disk storage devices or flash memory devices. In some embodiments, a non-transitory computer-readable storage medium in the memory 1202 is configured to store at least one instruction, the at least one instruction being executed by the processor 1201 to implement the data search method based on a quantum simulated algorithm provided in the method embodiments of the present disclosure.

In some embodiments, the terminal 1200 may in some embodiments include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral includes at least one of a display screen 1204 and a power supply 1205.

The peripheral interface 1203 may be configured to connect at least one peripheral related to input/output (I/O) to the processor 1201 and the memory 1202. In some embodiments, the processor 1201, the memory 1202, and the peripheral interface 1203 are integrated on the same chip or circuit board. In some other embodiments, any one or two of the processors 1201, the memory 1202, and the peripheral interface 1203 may be implemented on a separate chip or circuit board. This is not limited in this embodiment.

The display screen 1204 is configured to display a user interface (UI). The UI may include a graph, a text, an icon, a video, and any combination thereof. When the display screen 1204 is a touchscreen, the display screen 1204 is further capable of acquiring a touch signal on or above a surface of the display screen 1204. The touch signal may be inputted into the processor 1201 as a control signal for processing. In this case, the display screen 1204 may be further configured to provide a virtual button and/or a virtual keyboard that are/is also referred to as a soft button and/or a soft keyboard. In some embodiments, there may be one display screen 1204, disposed on a front panel of the terminal 1200. In some other embodiments, there may be at least two display screens 1204, respectively disposed on different surfaces of the terminal 1200 or designed in a foldable shape. In still some other embodiments, the display screen 1204 may be a flexible display screen, disposed on a curved surface or a folded surface of the terminal 1200. Even, the display screen 1204 may be further set in a non-rectangular irregular pattern, that is, a special-shaped screen. The display screen 1204 may be manufactured by using a material such as a liquid crystal display (LCD), an organic light-emitting diode (OLED), or the like.

The power source 1205 is configured to supply power for components in the terminal 1200. The power supply 1205 may be an alternating current, a direct current, a primary battery, or a rechargeable battery. When the power supply 1205 includes a rechargeable battery, the rechargeable battery may be a wired rechargeable battery or a wireless rechargeable battery. The rechargeable battery may be further configured to support a fast charge technology.

A person skilled in the art may understand that the structure shown in FIG. 12 does not constitute a limitation on the terminal 1200, and the terminal may include more components or fewer components than those shown in the figure, or some components may be combined, or a different component deployment may be used.

Figure 13:
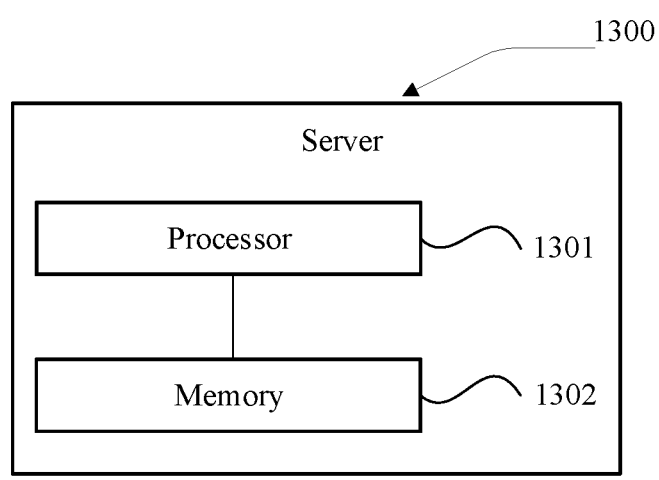
FIG. 13 is a schematic structural diagram of a server according to an embodiment of the present disclosure.

A description is made below by using an example in which the computer device is a server. FIG. 13 is a schematic structural diagram of a server according to an embodiment of the present disclosure. The server 1300 may vary greatly due to different configurations or performance, and may include one or more processors (such as CPUs) 1301 and one or more memories 1302. The memory 1302 stores at least one piece of program code, the at least one piece of program code being loaded and executed by the processor 1301 to implement the methods provided in the foregoing method embodiments. Certainly, the server may further include components such as a wired or wireless network interface, a keyboard, and an I/O interface, to facilitate inputting/outputting. The server may further include other components configured to implement device functions. Details are not described herein again.

The server 1300 may be configured to perform the operations performed by the server in the foregoing data search method based on a quantum simulated algorithm.

The computer device may alternatively be a quantum computer device. The quantum computer device can also be configured to perform the operations in the foregoing data search method based on a quantum simulated algorithm.

An embodiment of the present disclosure further provides a computer-readable storage medium. The computer-readable storage medium stores at least one piece of program code, the at least one piece of program code being loaded by a processor to perform the following operations:

creating first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found;

creating a first search path according to the first state data and the second state data, a starting point of the first search path referring to the first state, an ending point referring to the second state, and the first search path including a plurality of coefficients of which values are undetermined;

obtaining a first processing function corresponding to the first search path, the first processing function including the plurality of coefficients, output values of the first processing function being determined by the first search path, convergence of the output values of the first processing function indicating that the values of the plurality of coefficients meet a target;

traversing at least two value sets of the first search path, each value set including a plurality of values corresponding to the plurality of coefficients, a plurality of values in different value sets being not completely the same;

obtaining the output values of the first processing function based on a quantum simulated algorithm by respectively applying the traversed value sets as the plurality of values corresponding to the plurality of coefficients;

respectively using, when the output values of the first processing function converge, a plurality of values in value sets corresponding to the converging output values as the values of the plurality of coefficients, to obtain a second search path; and searching the plurality of pieces of candidate data for the target data by using the second search path.

In one embodiment, the at least one piece of program code is loaded by the processor to perform the following operations:

obtaining, when the output values of the first processing function do not converge, at least two value sets that have been traversed and output values of the first processing function that correspond to the at least two value sets;

performing function fitting on the at least two value sets and the corresponding output values to obtain a second processing function, the second processing function being configured to describe a distribution of the output values corresponding to the at least two value sets, and the second processing function including the plurality of coefficients; and obtaining an updated value set, so that an output value obtained by processing a plurality of values in the updated value set using an expectation function is a maximum output value of the expectation function, the expectation function being configured to describe an expected return of the second processing function.

In one embodiment, the at least one piece of program code is loaded by the processor to perform the following operations:

obtaining a condition probability corresponding to the at least two value sets when the at least two value sets meet a Gaussian distribution, the condition probability being a probability of obtaining the second processing function based on the at least two value sets and the corresponding output values when the distribution of the output values corresponding to the at least two value sets meets the Gaussian distribution; and adjusting the obtained second processing function according to the at least two value sets, the corresponding output values, and the condition probability, to obtain the adjusted second processing function.

In one embodiment, the at least one piece of program code is loaded by the processor to perform the following operations:

obtaining a maximum output value in the output values of the first processing function that correspond to the at least two value sets;

determining the expectation function corresponding to the second processing function according to a difference between the second processing function and the maximum output value, the expectation function being a function for averaging a maximum between the difference and 0; and determining a value set corresponding to the maximum output value of the expectation function as the updated value set by using a gradient algorithm.

In one embodiment, the at least one piece of program code is loaded by the processor to perform the following operations:

obtaining an average value and a variance that correspond to the at least two value sets when the at least two value sets meet the Gaussian distribution; and obtaining the condition probability corresponding to the at least two value sets according to the average value and the variance.

In one embodiment, the quantum simulated algorithm includes a plurality of subfunctions and an operation mode of determining the first processing function according to the plurality of subfunctions, and the at least one piece of program code is loaded by the processor to perform the following operations:

processing the plurality of values in the traversed value sets based on the quantum simulated algorithm, to respectively obtain first values outputted by the plurality of subfunctions; and performing, according to the operation mode, an operation on the first values outputted by the plurality of subfunctions, to obtain the output values of the first processing function.

In one embodiment, the at least one piece of program code is loaded by the processor to perform the following operation:

creating the first search path according to the first state data, the second state data, and a target search duration, the first search path further including the target search duration, and the target search duration being a duration required for converting the first state into the second state.

In one embodiment, the plurality of pieces of candidate data have different types, the search condition includes a target type, and the at least one piece of program code is loaded by the processor to perform the following operation:

searching, by using the second search path, the plurality of pieces of candidate data for the target data that meets the target type.

An embodiment of the present disclosure further provides a computer program, storing at least one piece of program code, the at least one piece of program code being loaded and executed by a processor to implement the operations performed in the data search method based on a quantum simulated algorithm in the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of the embodiments of the present disclosure, but are not intended to limit the embodiments of the present disclosure. Any modification, equivalent replacement, or improvement made within the spirit and principle of the embodiments of the present disclosure falls within the protection scope of the present disclosure.

What is claimed is:

1. A data search method based on a quantum simulated algorithm, applied to a computer device, the method comprising:

creating first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found;

creating a first search path according to the first state data and the second state data, a starting point of the first search path referring to the first state, an ending point referring to the second state, and the first search path comprising a plurality of coefficients of which values are undetermined;

obtaining a first processing function corresponding to the first search path, the first processing function comprising the plurality of coefficients, output values of the first processing function being determined by the first search path, convergence of the output values of the first processing function indicating that the values of the plurality of coefficients meet a target;

traversing at least two value sets of the first search path, each value set comprising a plurality of values corresponding to the plurality of coefficients, a plurality of values in different value sets being not completely the same;

obtaining the output values of the first processing function based on a quantum simulated algorithm by respectively applying the traversed value sets as the plurality of values corresponding to the plurality of coefficients;

respectively using, when the output values of the first processing function converge to a converging value, a plurality of values in a value set corresponding to the converging value as the values of the plurality of coefficients, to obtain a second search path; and searching the plurality of pieces of candidate data for the target data by using the second search path.

2. The method according to claim 1, wherein after the obtaining the output values of the first processing function based on a quantum simulated algorithm, the method further comprises:

obtaining, when the output values of the first processing function do not converge, the at least two value sets that have been traversed and output values of the first processing function that correspond to the at least two value sets;

performing function fitting on the at least two value sets and the corresponding output values to obtain a second processing function, the second processing function describing a distribution of the output values corresponding to the at least two value sets, and the second processing function comprising the plurality of coefficients; and obtaining an updated value set, wherein an output value obtained by processing a plurality of values in the updated value set using an expectation function is a maximum output value of the expectation function, the expectation function describing an expected return of the second processing function.

3. The method according to claim 2, wherein the performing function fitting on the at least two value sets and the corresponding output values to obtain a second processing function comprises:

obtaining a condition probability corresponding to the at least two value sets when the at least two value sets meet a Gaussian distribution, the condition probability being a probability of obtaining the second processing function based on the at least two value sets and the corresponding output values when the distribution of the output values corresponding to the at least two value sets meets the Gaussian distribution; and adjusting the obtained second processing function according to the at least two value sets, the corresponding output values, and the condition probability, to obtain the adjusted second processing function.

4. The method according to claim 2, wherein the obtaining an updated value set, so that an output value obtained by processing a plurality of values in the updated value set using an expectation function is a maximum output value of the expectation function comprises:

obtaining a maximum output value in the output values of the first processing function that correspond to the at least two value sets;

determining the expectation function corresponding to the second processing function according to a difference between the second processing function and the maximum output value, wherein the expectation function averages a maximum between the difference and 0; and determining a value set corresponding to the maximum output value of the expectation function as the updated value set by using a gradient algorithm.

5. The method according to claim 3, wherein the obtaining a condition probability corresponding to the at least two value sets when the at least two value sets meet a Gaussian distribution comprises:

obtaining an average value and a variance that correspond to the at least two value sets when the at least two value sets meet the Gaussian distribution; and obtaining the condition probability corresponding to the at least two value sets according to the average value and the variance.

6. The method according to claim 1, wherein the quantum simulated algorithm comprises a plurality of subfunctions and an operation mode of determining the first processing function according to the plurality of subfunctions, and the obtaining the output values of the first processing function based on a quantum simulated algorithm by respectively applying the traversed value sets as the plurality of values corresponding to the plurality of coefficients comprises:

processing the plurality of values in the traversed value sets based on the quantum simulated algorithm, to respectively obtain first values outputted by the plurality of subfunctions; and performing, according to the operation mode, an operation on the first values outputted by the plurality of subfunctions, to obtain the output values of the first processing function.

7. The method according to claim 1, wherein the creating a first search path according to the first state data and the second state data comprises:

creating the first search path according to the first state data, the second state data, and a target search duration, the first search path further comprising the target search duration, the target search duration being a duration required for converting the first state into the second state.

8. The method according to claim 1, wherein the plurality of pieces of candidate data have different types, the search condition comprises a target type, and the searching the plurality of pieces of candidate data for the target data by using the second search path comprises:

searching, by using the second search path, the plurality of pieces of candidate data for the target data that meets the target type.

9. A data search apparatus, comprising a processor and a memory, the memory storing at least one piece of program code, the at least one piece of program code being loaded and executed by the processor to:

create first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found;

create a first search path according to the first state data and the second state data, a starting point of the first search path referring to the first state, an ending point referring to the second state, and the first search path comprising a plurality of coefficients of which values are undetermined;

obtain a first processing function corresponding to the first search path, the first processing function comprising the plurality of coefficients, output values of the first processing function being determined by the first search path, convergence of the output values of the first processing function indicating that the values of the plurality of coefficients meet a target;

traverse at least two value sets of the first search path, each value set comprising a plurality of values corresponding to the plurality of coefficients, a plurality of values in different value sets being not completely the same;

obtain the output values of the first processing function based on a quantum simulated algorithm by respectively applying the traversed value sets as the plurality of values corresponding to the plurality of coefficients;

respectively use, when the output values of the first processing function converge to a converging value, a plurality of values in a value set corresponding to the converging value as the values of the plurality of coefficients, to obtain a second search path; and search the plurality of pieces of candidate data for the target data by using the second search path.

10. The apparatus according to claim 9, wherein when executing the at least one piece of program code, the processor is further configured to:

obtain, when the output values of the first processing function do not converge, the at least two value sets that have been traversed and output values of the first processing function that correspond to the at least two value sets;

perform function fitting on the at least two value sets and the corresponding output values to obtain a second processing function, the second processing function describing a distribution of the output values corresponding to the at least two value sets, and the second processing function comprising the plurality of coefficients; and obtain an updated value set, so that an output value obtained by processing a plurality of values in the updated value set using an expectation function is a maximum output value of the expectation function, the expectation function describing an expected return of the second processing function.

11. The apparatus according to claim 10, wherein when executing the at least one piece of program code, the processor is further configured to:

obtain a condition probability corresponding to the at least two value sets when the at least two value sets meet a Gaussian distribution, the condition probability being a probability of obtaining the second processing function based on the at least two value sets and the corresponding output values when the distribution of the output values corresponding to the at least two value sets meets the Gaussian distribution; and adjust the obtained second processing function according to the at least two value sets, the corresponding output values, and the condition probability, to obtain the adjusted second processing function.

12. The apparatus according to claim 10, wherein when executing the at least one piece of program code, the processor is further configured to:

obtain a maximum output value in the output values of the first processing function that correspond to the at least two value sets;

determine the expectation function corresponding to the second processing function according to a difference between the second processing function and the maximum output value, the expectation function being a function for averaging a maximum between the difference and 0; and determine a value set corresponding to the maximum output value of the expectation function as the updated value set by using a gradient algorithm.

13. The apparatus according to claim 11, wherein when executing the at least one piece of program code, the processor is further configured to:

obtain an average value and a variance that correspond to the at least two value sets when the at least two value sets meet the Gaussian distribution; and obtain the condition probability corresponding to the at least two value sets according to the average value and the variance.

14. The apparatus according to claim 9, wherein the quantum simulated algorithm comprises a plurality of subfunctions and an operation mode of determining the first processing function according to the plurality of subfunctions, and the processor is further configured to:

process the plurality of values in the traversed value sets based on the quantum simulated algorithm, to respectively obtain first values outputted by the plurality of subfunctions; and perform, according to the operation mode, an operation on the first values outputted by the plurality of subfunctions, to obtain the output values of the first processing function.

15. The apparatus according to claim 11, wherein when executing the at least one piece of program code, the processor is further configured to:

create the first search path according to the first state data, the second state data, and a target search duration, the first search path further comprising the target search duration, the target search duration being a duration required for converting the first state into the second state.

16. The apparatus according to claim 11, wherein the plurality of pieces of candidate data have different types, the search condition comprises a target type, and the processor is further configured to:

search, by using the second search path, the plurality of pieces of candidate data for the target data that meets the target type.

17. A non-transitory computer-readable storage medium, storing at least one piece of program code, the at least one piece of program code being loaded and executed by a processor to perform:

creating first state data and second state data according to a plurality of pieces of candidate data, a first state corresponding to the first state data being a state in which the plurality of pieces of candidate data have a same selection probability, and a second state corresponding to the second state data being a state in which target data that meets a search condition has been found;

creating a first search path according to the first state data and the second state data, a starting point of the first search path referring to the first state, an ending point referring to the second state, and the first search path comprising a plurality of coefficients of which values are undetermined;

obtaining a first processing function corresponding to the first search path, the first processing function comprising the plurality of coefficients, output values of the first processing function being determined by the first search path, convergence of the output values of the first processing function indicating that the values of the plurality of coefficients meet a target;

traversing at least two value sets of the first search path, each value set comprising a plurality of values corresponding to the plurality of coefficients, a plurality of values in different value sets being not completely the same;

obtaining the output values of the first processing function based on a quantum simulated algorithm by respectively applying the traversed value sets as the plurality of values corresponding to the plurality of coefficients;

respectively using, when the output values of the first processing function converge to a converging value, a plurality of values in a value set corresponding to the converging value as the values of the plurality of coefficients, to obtain a second search path; and searching the plurality of pieces of candidate data for the target data by using the second search path.

18. The storage medium according to claim 17, wherein after the obtaining the output values of the first processing function based on a quantum simulated algorithm, the at least one piece of program code further causes the processor to perform:

obtaining, when the output values of the first processing function do not converge, the at least two value sets that have been traversed and output values of the first processing function that correspond to the at least two value sets;

performing function fitting on the at least two value sets and the corresponding output values to obtain a second processing function, the second processing function describing a distribution of the output values corresponding to the at least two value sets, and the second processing function comprising the plurality of coefficients; and obtaining an updated value set, wherein an output value obtained by processing a plurality of values in the updated value set using an expectation function is a maximum output value of the expectation function, the expectation function describing an expected return of the second processing function.

19. The storage medium according to claim 18, wherein the performing function fitting on the at least two value sets and the corresponding output values to obtain a second processing function comprises:

obtaining a condition probability corresponding to the at least two value sets when the at least two value sets meet a Gaussian distribution, the condition probability being a probability of obtaining the second processing function based on the at least two value sets and the corresponding output values when the distribution of the output values corresponding to the at least two value sets meets the Gaussian distribution; and adjusting the obtained second processing function according to the at least two value sets, the corresponding output values, and the condition probability, to obtain the adjusted second processing function.

20. The storage medium according to claim 18, wherein the obtaining an updated value set, so that an output value obtained by processing a plurality of values in the updated value set using an expectation function is a maximum output value of the expectation function comprises:

obtaining a maximum output value in the output values of the first processing function that correspond to the at least two value sets;

determining the expectation function corresponding to the second processing function according to a difference between the second processing function and the maximum output value, wherein the expectation function averages a maximum between the difference and 0; and determining a value set corresponding to the maximum output value of the expectation function as the updated value set by using a gradient algorithm.

* * * * *